United States Patent
Mehta et al.

(10) Patent No.: US 9,495,192 B2
(45) Date of Patent: *Nov. 15, 2016

(54) NUMA I/O AWARE NETWORK QUEUE ASSIGNMENTS

(71) Applicant: VMWare, Inc., Palo Alto, CA (US)

(72) Inventors: Rishi Mehta, San Jose, CA (US); Xiaochuan Shen, Fremont, CA (US); Amitabha Banerjee, San Jose, CA (US); Ayyappan Veeraiyan, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/530,574

(22) Filed: Oct. 31, 2014

(65) Prior Publication Data

US 2016/0092258 A1 Mar. 31, 2016

Related U.S. Application Data

(60) Provisional application No. 62/058,033, filed on Sep. 30, 2014.

(51) Int. Cl.
*G06F 9/46* (2006.01)
*G06F 9/455* (2006.01)
*G06F 12/02* (2006.01)
*G06F 12/08* (2016.01)
*G06F 9/445* (2006.01)

(52) U.S. Cl.
CPC ........... *G06F 9/45558* (2013.01); *G06F 8/665* (2013.01); *G06F 12/023* (2013.01); *G06F 12/0815* (2013.01); *G06F 2009/45583* (2013.01); *G06F 2212/2542* (2013.01)

(58) Field of Classification Search
None
See application file for complete search history.

(56) References Cited

U.S. PATENT DOCUMENTS

| | | |
|---|---|---|
| 2010/0250868 A1* | 9/2010 | Oshins ................ G06F 12/0284 711/154 |
| 2012/0278800 A1 | 11/2012 | Nicholas |
| 2013/0239119 A1* | 9/2013 | Garg ..................... G06F 9/5083 718/105 |
| 2015/0052287 A1 | 2/2015 | Venkatasubramanian et al. |
| 2015/0058861 A1 | 2/2015 | Zheng et al. |
| 2015/0277779 A1* | 10/2015 | Devarapalli .......... G06F 3/0611 711/162 |
| 2016/0062802 A1* | 3/2016 | Guan .................... G06F 9/4881 711/148 |
| 2016/0085571 A1 | 3/2016 | Kim et al. |

OTHER PUBLICATIONS

Lee, Adam, "Notice of Allowance and Fee(s) Due", U.S. Appl. No. 14/530,587, mailed Jun. 2, 2016, 19 pages.

* cited by examiner

*Primary Examiner* — Adam Lee
(74) *Attorney, Agent, or Firm* — Adeli LLP

(57) ABSTRACT

Systems and methods for preferentially assigning virtual machines (VMs) on a particular NUMA node with network queues on the same NUMA node are described. A load balancer process on a host assigns multiple VMs to network queues. The assignment of the VMs to a network queues is performed with a bias toward assigning VMs using a particular NUMA node to network queues on the same NUMA node. A scheduler on the host assigns VMs to NUMA nodes. The scheduler is biased toward assigning VMs to the same NUMA node as the PNIC and/or the same NUMA node as a network queue assigned to the VM.

21 Claims, 16 Drawing Sheets

NUMA I/O AWARE NETWORK QUEUE ASSIGNMENTS

BACKGROUND

In recent years, computer systems have been developed to use multiple processors and multiple sets of memory circuits that are accessible to the multiple processors of the computer system. In some computer systems, each processor has access to both local memory (of that processor) and non-local memory (memory local to another processor or shared by multiple processors). A processor can access its local memory more efficiently (e.g., with less time between a request for data from the memory and receipt of that data from the memory) than non-local memory. Some systems are programmed so that a processor uses its local memory as much as possible, accessing non-local memory only when the memory requirements of that processor exceed the capacity of that local memory. In some cases, the combination of a processor and its local memory is characterized as a non-uniform memory access (NUMA) node. In some datacenters and enterprise software networks that implement virtual machines, a scheduler assigns the virtual machines to use particular NUMA nodes. In some cases, the assignments are temporary and a virtual machine can be assigned to different NUMA nodes at different times. In some cases, other processes of a host machine that implements the virtual machines are also assigned to NUMA nodes (e.g., by a load balancer). One type of process on a host machine that is assigned to NUMA nodes is a network queue (sometimes called a "queue") of a physical network interface card (PNIC or NIC).

In the last few years, queue management systems have been proposed for distributing incoming and outgoing traffic to and from a host through a NIC with multiple queues. FIG. 1 illustrates one such system. Specifically, it illustrates (1) multiple virtual machines (VMs) 102 that execute on a host computer (not shown), and (2) a NIC 100 that has multiple queues. As shown in this figure, each queue has a receive side set 104 of buffers and a transmit side set 106 of buffers to handle respectively incoming and outgoing traffic. The system has four types of queues, which are: a default queue 105, several non-default queues 115, LRO (large receive offload) queues 120 and RSS (receive side scaling) queues 125. The latter two types of queues are specialty queues tied to specific hardware LRO and RSS functionalities supported by the NIC.

BRIEF SUMMARY

Some embodiments provide a VM and network queue management system that efficiently and dynamically manages multiple queues that process traffic to and from multiple virtual machines (VMs) executing on a host. The system assigns VMs to queues and NUMA nodes with a bias toward assigning VMs to the same NUMA nodes as their assigned queues.

Some embodiments assign VMs to queues and NUMA nodes in which the VM uses a queue on the same NUMA node as the VM. In some embodiments, a load balancer determines which of multiple queues a VM will be assigned to. The load balancer of some embodiments generates its assignments based on various considerations, with a bias toward assigning the VMs to queues on the same NUMA node as the VM. In some embodiments, the load balancer also determines whether to split or consolidate queues as network traffic increases or decreases.

The VMs are assigned to particular NUMA nodes by a scheduler in some embodiments. The scheduler of some embodiments dynamically assigns the VMs to use particular NUMA nodes. The scheduler of some embodiments generates its assignments based on various considerations, with a bias toward assigning the VMs to the NUMA node that the PNIC is assigned to. In some embodiments, the scheduler also biases its assignment toward assigning VMs to NUMA nodes already in use by the queue to which the VM is assigned.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
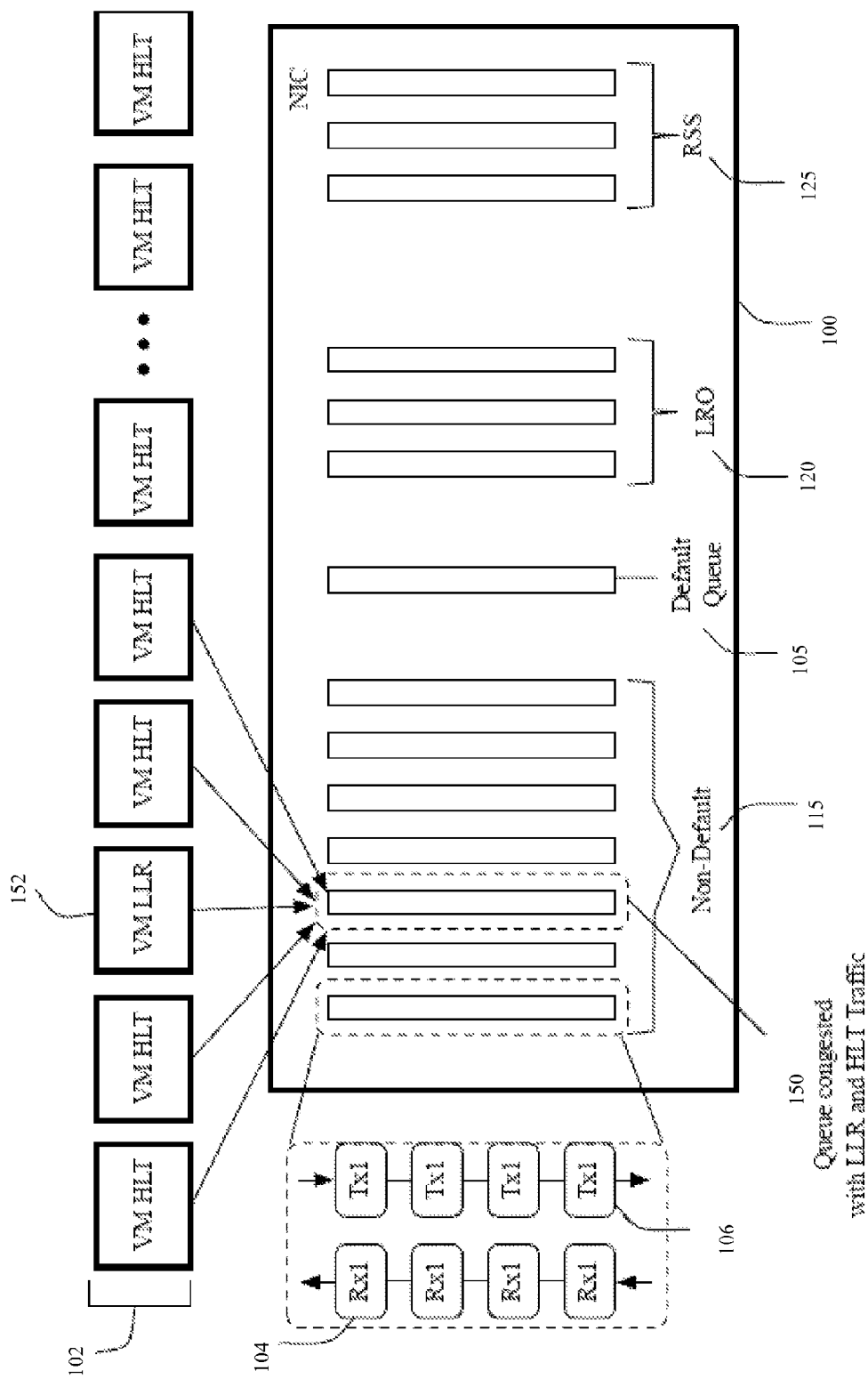
FIG. 1 illustrates a queue management system or distributing incoming and outgoing traffic to and from VMs on a host through a NIC with multiple queues.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

In some embodiments a NUMA node includes one or more processing units and local memory associated with those processing units. Any process on a host machine is assigned to a particular NUMA node, as is each virtual machine. The NUMA nodes are allocated dynamically. In some cases, a process can perform actions that require the use of non-local memory and/or the use of processors from multiple NUMA nodes. One type of process that can perform actions that use multiple NUMA nodes is the transmission of data between (e.g., to and/or from) a virtual machine and a physical network interface card (PNIC) on the host of the virtual machine. When a VM sends data, the virtual machine uses its assigned NUMA node and the data is sent through a network queue to the PNIC. When the VM is transmitting data from a different NUMA node than the device/network queue, the system gets poorer network performance. The transmission rate is reduced because data has to be sent to and received from memory that is not local to the VM. In such a transmission, data is sent from one NUMA node to another through an interconnect, delaying the data compared to cases where the data passes only through one NUMA node.

Some embodiments provide a NUMA assignment process (e.g., a scheduler) that assigns VMs to use (or operate on) particular NUMA nodes. The scheduler of some embodiments is biased toward assigning a VM to the same NUMA node as a network queue to which the VM is assigned. Some embodiments provide a process (e.g., a load balancer) that assigns network queues to particular VMs. The load balancer of some embodiments is biased toward assigning a VM that uses a particular NUMA node to use a network queue that uses the particular NUMA node.

The load balancers of some embodiments implement a queue management system that efficiently and dynamically manages multiple queues that process traffic to and from multiple virtual machines (VMs) executing on a host. This system manages the queues by (1) breaking up the queues into different priority pools with the higher priority pools reserved for particular types of traffic or VMs (e.g., traffic for VMs that need low latency), (2) dynamically adjusting the number of queues in each pool (i.e., dynamically adjusting the size of the pools), (3) dynamically reassigning a VM to a new queue based on one or more optimization criteria (e.g., criteria relating to the underutilization or overutilization of the queue, NUMA node matching, etc.).

In some embodiments, the queue management system groups the queues into four types of pools. These are:

(1) a default pool that includes in some embodiments one default queue that is the initial queue for some or all of the VMs upon their initialization (in other embodiments, the default pool includes more than one default queue);

(2) a free pool that includes all of the unused queues (i.e., the queues that are not assigned to traffic to or from any VM);

(3) hardware-feature pool that includes queues associated with a particular hardware feature, such as LRO and RSS;

(4) VM-requirement pools that include queues that serve VMs with different kinds of requirements, such as low latency required (LLR) VMs and high latency tolerated (HLT) VMs.

In some of these embodiments, the queue management system initially has all the queues in an unassigned, free pool, except for one default queue that is in the default pool. Some embodiments do not allocate the default queue until the first VM is initialized, while other embodiments specify the default queue even before the first VM is initialized.

When a VM's traffic exceeds a pre-set threshold, the system determines if there is a pool matching the VM's traffic requirement (e.g., if there is an LLR pool for an LLR VM that is exceeding its threshold), and if so, the system assigns the VM to that pool. If there is no matching pool, the system creates a new pool and assigns the VM to that pool. When there are no free queues for creating new pools, the queue management system preempts (i.e., re-assigns) one or more assigned queues (i.e., queues assigned to previously specified pools) and assigns the preempted queue(s) to the newly created pool. This preemption rebalances queues amongst existing pools to free up one or more queue(s) for the new pool. In some embodiments, the rebalancing process across pools is based on one or more resource allocation criteria, such as minimum and maximum size of a pool, relative priorities of the pools, etc.

In addition to balancing queues across pools, the queue management system of some embodiments rebalances traffic within a pool. This system uses different criteria in different embodiments to rebalance traffic within a pool. Examples of such criteria include CPU load of the associated management thread, traffic type, traffic load, other real-time load metrics of the queues, etc. In some embodiments, the system uses different rebalancing criteria for different pools. For instance, the system tries to pack VMs onto fewer queues in some pools and distribute VMs across more queues in some other pools. In some embodiments, the queue management system has a load balancer that performs the rebalancing process periodically and/or on special events.

When a VM's traffic falls below a threshold, the queue management system of some embodiments moves the VM from a non-default queue back to a default queue. When the VM is the last VM using a particular non-default queue, the particular (now unused) queue is moved to the free pool of unassigned queues so that it can later be reallocated to any pool. Thus, under this approach, a queue is assigned to one of the non-default pools as soon as the queue gets assigned a VM, and it is assigned back to the free pool as soon as its last VM is reassigned or is shut off.

In addition to or instead of handling the VM data traffic, the queue management system of some embodiments dynamically defines pools, uniquely manages each pool, dynamically modifies the queues within the pools, and dynamically re-assigns data traffic to and from non-VM addressable locations (e.g., source end addresses or destination end addresses) that execute on a host.

I. Non-Uniform-Memory Access (NUMA) Nodes

Figure 2:
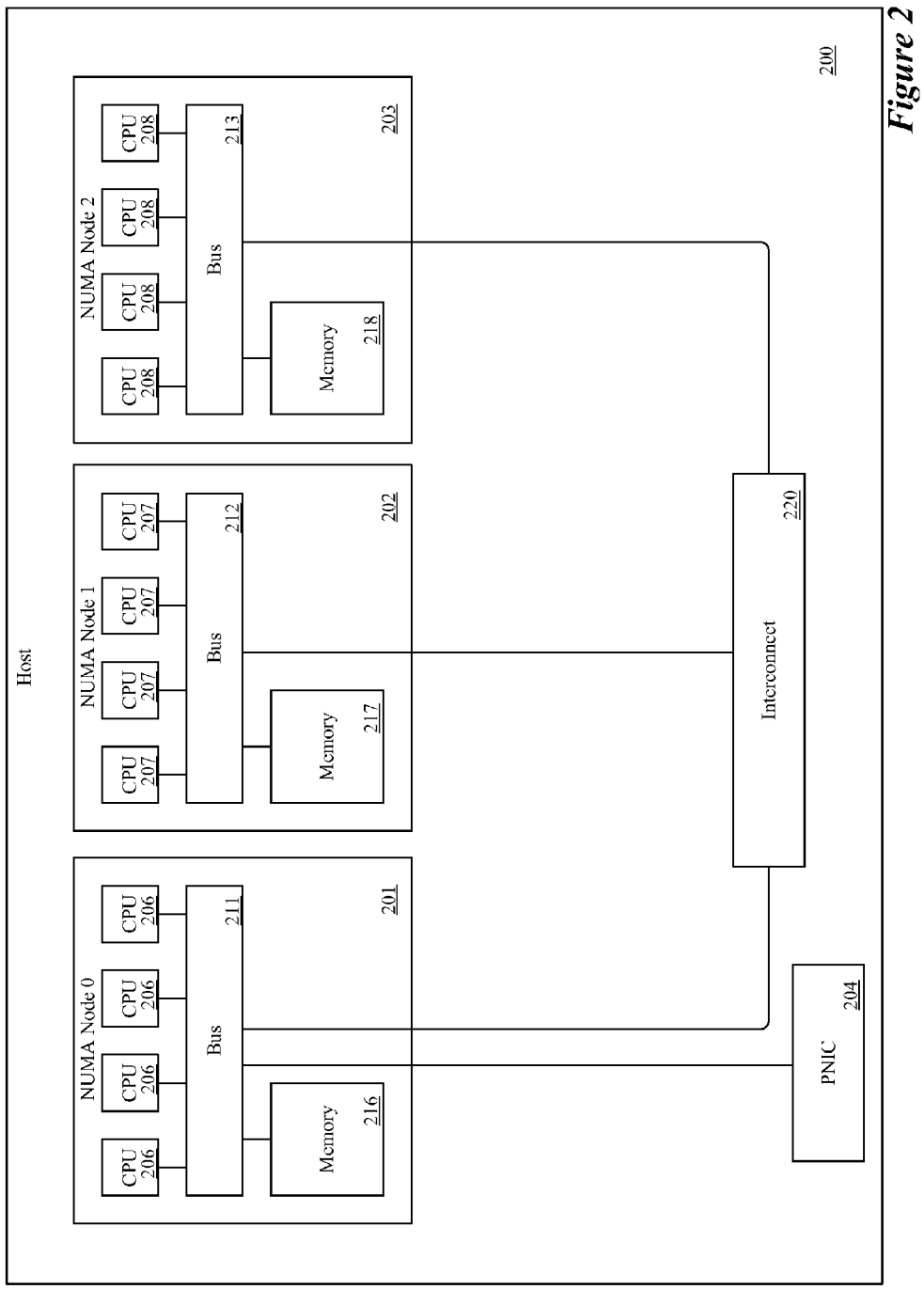
FIG. 2 illustrates multiple NUMA nodes on a host system.

Some embodiments of the NUMA matching system are implemented on host systems for virtual machines (VMs). Some such host systems include multiple processing units with access to both local memory of the processors and non-local memory (e.g., shared memory or memory local to other processors. The combination of one or more processing units and its local memory is sometimes called a "NUMA node". FIG. 2 illustrates multiple NUMA nodes on a host system. The figure includes a host system 200 with NUMA nodes 201-203 and PNIC 204. Each NUMA node 201-203 includes memory and multiple processing units (e.g., central processing units or CPUs). NUMA node 201 includes processing unit 206, bus 211, and memory 216. NUMA node 202 includes processing unit 207, bus 212, and memory 217. NUMA node 203 includes processing unit 208, bus 213, and memory 218. The host system also includes an interconnect 220 that interconnects the different NUMA nodes 201-203.

Host system 200 is a host system for VMs. NUMA nodes 201-203 include processing units and local memory associated with those processing units. In some embodiments, processing units of one NUMA node can quickly access the local memory of that NUMA node. Generally, processing units are able to access the local memory of their NUMA node quickly, while accessing local memory of the other NUMA nodes would take more time. The processing units 206-208 of some embodiments are implemented as multiple processing cores of a single chip (e.g., on a multi-core chip). In other embodiments, the processing units 206-208 are implemented as separate chips. In some embodiments, the processing units of multiple NUMA nodes are located on the same chip.

The buses 211-213 of NUMA nodes 201-203 each allow the processing units 206-208 of the NUMA nodes to access local memory 216-218 of the same NUMA node and (through the interconnect 220) access non-local memory 216-218 of other NUMA nodes. The interconnect 220 allows processing units on one NUMA node to access memory on another NUMA node (e.g., processing units of NUMA node 201 are able to access memory 217-218 on NUMA nodes 202 and 203). In context of the processing units and memory of a NUMA node, "on a NUMA node" means "part of a NUMA node". In the context of a process or device (e.g., a PNIC) "on a NUMA node" means "assigned to use a NUMA node".

Each process or processing thread running on the host machine 200 is implemented by one or more processing units 206-208. A process runs more quickly if data and instructions associated with that process is stored on the memory 216-218 associated with the processing units 206-208 that the process is running on. In some cases, the local memory 216-218 of a NUMA node may not be enough to hold all data and/or instructions for a particular process. In such a case, the processing units 206-208 on which the process is running will access additional memory 216-218 of other nodes.

PNICs can be installed in various slots on a motherboard of a server. For example PCIe PNICs can be assigned to various PCIe slots on the motherboard. In some embodiments, a PNIC's NUMA node is determined by which slot (e.g., which PCIe slot) the PNIC is installed in on the server motherboard. Each slot is associated with a particular NUMA node and can't be changed to associate with a different NUMA node. So in some embodiments, a PNIC's NUMA node can't be changed without physically moving the PNIC to a different slot. Here, PNIC 204 is using a slot associated with NUMA node 201. In some embodiments, the PNIC 204 can use resources (e.g., CPUs or memory) associated with NUMA nodes 202-203, but any data transfer between the PNIC 204 and NUMA nodes 202-203 is through interconnect 220 and is therefore less efficient than data transfers between PNIC 204 and NUMA node 201.

II. Queue Management System

Figure 3:
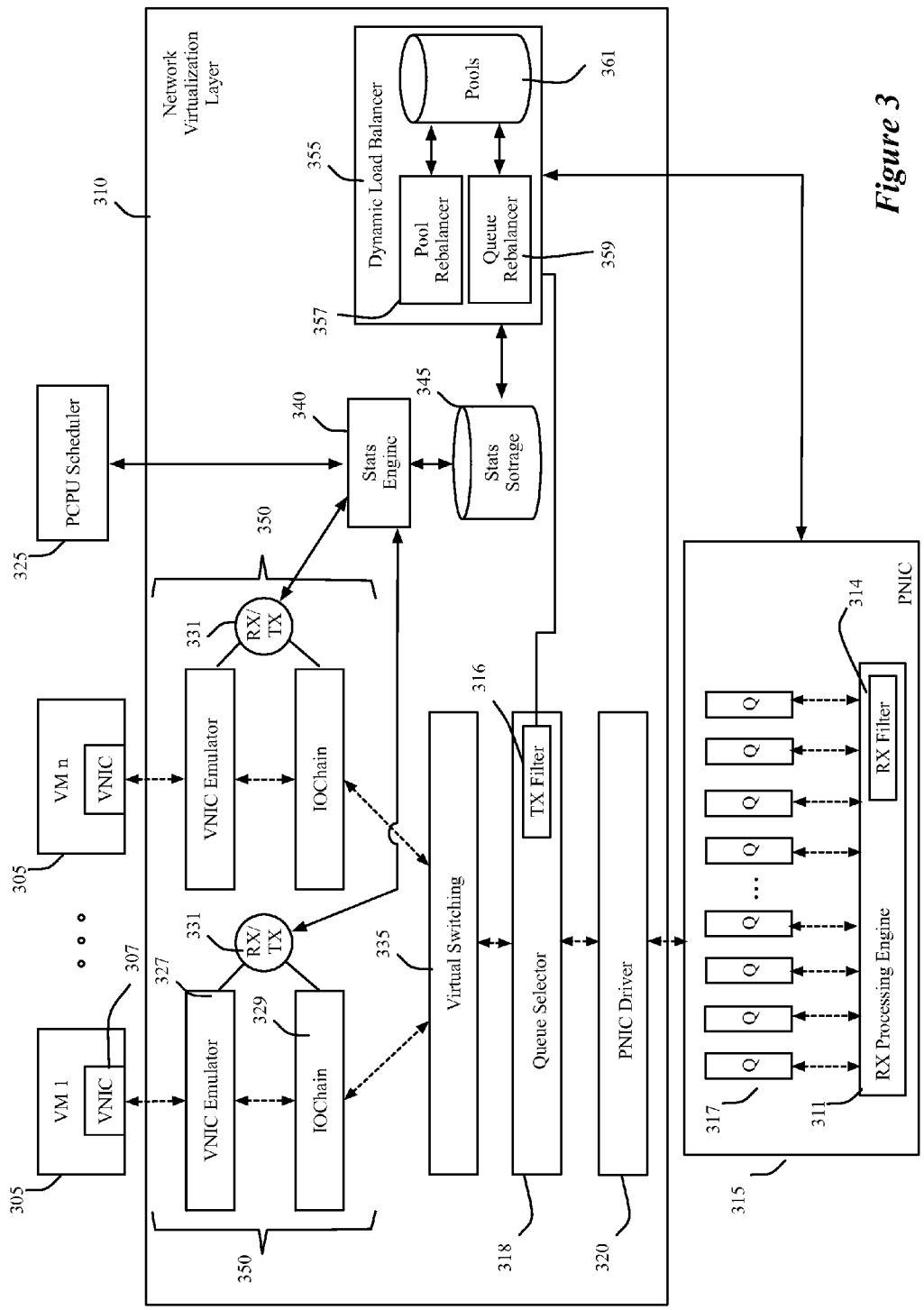
FIG. 3 illustrates (1) several VMs that are executing on a host and network systems for sending traffic from the VMs to a network outside the host.

The queue management system of some embodiments will now be described by reference to FIG. 3. FIG. 3 describes a system 300 that breaks up the queues into different priority pools with the higher priority pools reserved for different types of traffic or VMs (e.g., traffic for VMs that need low latency). It also dynamically adjusts the number of queues in each pool (i.e., dynamically adjusts the size of the pools), and dynamically reassigns a VM to a new queue in its pool based on one or more optimization criteria (e.g., criteria relating to the underutilization or overutilization of the queue).

FIG. 3 illustrates (1) several VMs 305 that are executing on a host, (2) the host's physical NIC (PNIC) 315 that is shared by the VMs, (3) a network virtualization layer 310 that executes on the host and facilitates traffic to and from the VMs through the shared PNIC, and (4) a physical processor scheduler 325 (also called physical CPU or PCPU) that is a kernel scheduler that directs the processors as to when and where to run one of the threads (also called contexts).

The PNIC 315 has several queues 317. These queues include receive side queues for storing incoming data received by the host and transmit side queues for storing outgoing data transmitted from the VMs. In some embodiments, each queue includes a set of buffers for storing incoming or outgoing data. In some embodiments, the receive side queues are separate and independent from the transmit side queues, but the virtualization layer pairs one receive side queue with one transmit side queue so that the queue pair can be used as one queue construct for a VM. Other embodiments, however, do not "pair" the queues. In other words, these embodiments do not require all the VMs that use a receive side queue to use the same transmit side queue; two VM can use the same receive side queue, but different transmit side queues.

The PNIC also has a receive (RX) side processing engine 311 for receiving incoming packets from a wired or wireless link. The RX processing engine has a MAC filter 314, which is configured to associate each VM's incoming traffic to one queue pair based on the destination MAC. The virtualization layer maintains an analogous filter 316 for outgoing packets, and a queue selector 318 in this layer uses the data in this filter to configure each VM's outgoing traffic to use the same queue pair as the incoming traffic. In some embodiments, the filter 316 specifies a VM in terms of the VM's or its VNIC's source MAC address, while in other embodiments it specifies a VM in terms of the port ID of a software forwarding element to which the VM's VNIC connects. In some embodiments, the PNIC also includes circuitry for monitoring the queues and generating interrupts.

The VMs executes on top of a hypervisor (not shown), which, in some embodiments, includes the network virtualization layer 310. FIG. 3 shows each VM to include a virtual NIC (VNIC) 307. It also shows the network virtualization layer 310 to include (1) one network stack 350 for each VM, (2) a software forwarding element 335, (3) a statistics-gathering engine 340, (4) a statistics storage 345, and (5) a dynamic load balancer 355. Each network stack includes a VNIC emulator 327, and an I/O chain 329. Each network stack is managed by receive/transmit threads 331.

Each network stack connects to its VM through its VNIC emulator and connects to the software forwarding element 335, which is shared by all the network stacks of all the VMs. Each network stack connects to the software forwarding element through a port (not shown) of the switch. In some embodiments, the software forwarding element maintains a single port for each VNIC. The software forwarding element 335 performs packet-processing operations to forward packets that it receives on one of its ports to another one of its ports, or to one of the ports of another software forwarding element that executes on another host. For example, in some embodiments, the software forwarding element tries to use data in the packet (e.g., data in the packet header) to match a packet to flow based rules, and upon finding a match, performs the action specified by the matching rule.

In some embodiments, software forwarding elements executing on different host devices (e.g., different computers) are configured to implement different logical forwarding elements (LFEs) for different logical networks of different tenants, users, departments, etc. that use the same shared compute and networking resources. For instance, two software forwarding elements executing on two host devices can perform L2 switch functionality. Each of these software switches can in part implement two different logical L2 switches, with each logical L2 switch connecting the VMs of one entity. In some embodiments, the software forwarding elements provide L3 routing functionality, and can be configured to implement different logical routers with the software L3 routers executing on other hosts.

In the virtualization field, some refer to software switches as virtual switches as these are software elements. However, in this document, the software forwarding elements are referred to as physical forwarding elements (PFEs), in order to distinguish them from logical forwarding elements, which are logical constructs that are not tied to the physical world. In other words, the software forwarding elements are referred to as PFEs because they exist and operate in the physical world, whereas logical forwarding elements are simply a logical representation of a forwarding element that is presented to a user. Examples of logical forwarding elements are logical forwarding elements, such as logical switches, logical routers, etc. U.S. patent application Ser. No. 14/070,360 provides additional examples of PFEs and LFEs, and is incorporated herein by reference.

The software forwarding element 335 connects to the PNIC 315 to send outgoing packets and to receive incoming packets. In some embodiments, the software forwarding element is defined to include a port through which it connects to the PNIC to send and receive packets. As mentioned above, the queue selector 318 is interposed between the software forwarding element 335 and the PNIC in some embodiments. The queue selector selects the receive side queues for retrieving incoming packets and transmit side queues for supplying outgoing packets. As mentioned above, the queue selector uses the data in the filter 316 to identify the transmit side queue for supplying a particular VMs outgoing traffic. The selector does not use the data in the filter to select a queue and retrieve its packets for a RX thread of a VM. In some embodiments, the queue selector is part of the receive/transmit threads 331 of the network stacks, as further described below. As such, for these embodiments, the queue selector 318 is a conceptual representation of the queue selection operation that the receive/transmit threads 331 perform in some embodiments.

Each VNIC in the VM is responsible for exchanging packets between the VM and the network virtualization layer through its associated VNIC emulator 327. Each VNIC emulator interacts with NIC drivers in the VMs to send and receive data to and from VMs. In some embodiments, the VNICs are software abstractions of physical NICs implemented by virtual NIC emulators. For instance, the code for requesting and obtaining a connection ID reside in components of virtual NIC emulators in some embodiments. In other words, the VNIC state is implemented and maintained by each VNIC emulator in some embodiments. Virtual devices such as VNICs are software abstractions that are convenient to discuss as though part of VMs, but are actually implemented by virtualization software using emulators. The state of each VM, however, includes the state of its virtual devices, which is controlled and maintained by the underlying virtualization software. Even though FIG. 3 shows one VNIC emulator for each VNIC of each VM, each VNIC emulator may maintain the state for more than one VNIC and/or for more than one VM in some embodiments.

The I/O chain in each network stack includes a series of modules that perform a series of tasks on each packet. As described in the above-incorporated U.S. patent application Ser. No. 14/070,360, two examples of I/O chain modules are an ARP and DHCP proxy modules that resolve ARP and DHCP broadcast messages without resorting to broadcasting these messages. Other examples of the processes performed by the modules in the I/O chain include firewall and traffic tunneling operations. The input/output of the I/O chain goes to one of the ports of the software forwarding element.

In some embodiments, the receive/transmit threads 331 of each network stack 350 are kernel-level threads that manage the modules in the network stack. These threads also manage the PNIC queue 317 that is associated with the stack's VM. Specifically, in some embodiments, the receive side of each queue has a dedicated RX kernel thread to handle interrupts and poll packets from the receive side of the queue. Also, each VM has a dedicated TX kernel thread to handle packets sent from the VM. In some embodiments, each pair of receive/transmit threads are executed by one of the cores of a multi-core processor(s) of the host, as the recommended number of queues in these embodiments equals the numbers of the cores of the multi-core processor(s) of the host. Even through separate receive and transmit threads are used for separately managing the receive and transmit operations of the stack and its associated queue in FIG. 3, one of ordinary skill will realize that in other embodiments one thread is used to perform both of these tasks. Also, in some embodiments, the RX/TX thread(s) may not be tied or as strictly tied to the queues, cores and/or VMs.

As mentioned above, the network virtualization layer also includes the statistics (stat) gathering engine 340, the stat storage 345 and the dynamic load balancer 355. The stat gathering engine 340, load balancer 355 and the RX/TX threads 331 form in part the queue management system of some embodiments. The statistics that are gathered by the stat gathering engine 340 provide the load balancer with the information that it needs to determine when to assign queues to pools and when to adjust pools.

The stat gathering 340 engine gets statistics from different sources in different embodiments. For instance, in some embodiments, this engine pulls stats or receives pushed stats from either the CPU scheduler 325 (for CPU utilizations) and the RX/TX threads (for network traffic). For the network traffic, the network virtualization layer has stats (such as throughput, packet rate, packet drops, etc.) gathered from a variety of sources, including each layer of the network stacks (i.e., each module managed by the RX/TX threads).

In some embodiments, the stats gathering engine 340 gathers the following network stats for the load balancer: PNIC packet rate, PNIC throughput, and the CPU utilization for each of RX/TX threads. In some embodiments, the CPU scheduler 325 updates the CPU utilization data, while the RX/TX threads update the PNIC packet rate and throughput, since they are the threads that actually communicate with the PNIC and have the exact counts. In some embodiments, a PNIC driver module 320 is below the queue selector, and this PNIC driver 320 is the module that communicates with the PNIC and updates the PNIC load statistics. Also, in some embodiments, the stats gathering engine not only gathers the PNIC statistics for the load balancer, but also gathers VNIC stats collected by the VNIC emulator.

By relying on VNIC stats, the load balancer can decide to move a latency-sensitive VM to an exclusive queue when its VNIC packet rate is above some threshold that might start hurting (e.g., causing excessive delays in traffic speed and/or reliability) whichever VMs are sharing the same queue with it. More generally, the load balancer 355 uses the gathered stats to determine which queues to assign to which VMs, when to dynamically assign queues to pools and when to dynamically adjust pools.

In some embodiments, the load balancer periodically (e.g., every few seconds, few milliseconds, few microseconds, etc.) runs a load balancing process. This process pulls stats from the "load stats" data storage 345 that the stat gathering engine 340 maintains, and based on these stats, determines whether it needs to allocate pools, to de-allocate pools, to assign VMs to queues, to resize pools, and/or to preempt (i.e., re-assign) queues. In some embodiments, the load balancer assigns VMs to queues by configuring the filters of the PNIC and the virtualization layer to associate a particular queue identifier with a particular source MAC address for outgoing traffic and a particular destination MAC for incoming traffic. To configure the MAC filters of the PNIC, the load balancer uses APIs of the PNIC driver 320 to program filters and hardware features for each queue.

As shown in FIG. 3, the load balancer has three modules, which are the pools 361, the queue balancer 359 and the pool balancer 357. Pools are a software abstract grouping of PNIC queues that the load balancer defines. The load balancer applies different processes to manage queues in different "pools." As such, each pool can be viewed as a set of queues that have the same "feature," where a feature is analogous to hardware features (like RSS/LRO). Examples of such features include VMs requirements (such as low-latency or low-interrupt-rate).

By applying different processes to manage queues in different pools, the load balancer can optimize the allocation of queues and the resizing of the pools differently for different pools. The pool rebalancer 357 resizes each pool based on the pool's resource allocation criteria and preempts (i.e., re-assigns) queues from other pools when necessary. Example of such resource allocation criteria include max/min number of queues of the pool, total CPU utilization of the pool, network traffic of the pool, quality of service (QoS) constraints of the pool, etc. The queue rebalancer 359 rebalances (e.g., re-assigns resources as needed to satisfy particular criteria) the queues in the same pool based on the pool's rebalancing criteria. Example of such pool rebalancing criteria include packing VMs on as few queues as possible (e.g., for an HLT pool), distributing the VMs across as many queues as possible (e.g., for an LLR pool), etc. In some embodiments, different load balancing processes that manage different pools specify different resource allocation criteria, different preemption criteria, different rebalancing criteria, etc.

III. Adjusting VM Allocation and Pools

Figure 4:
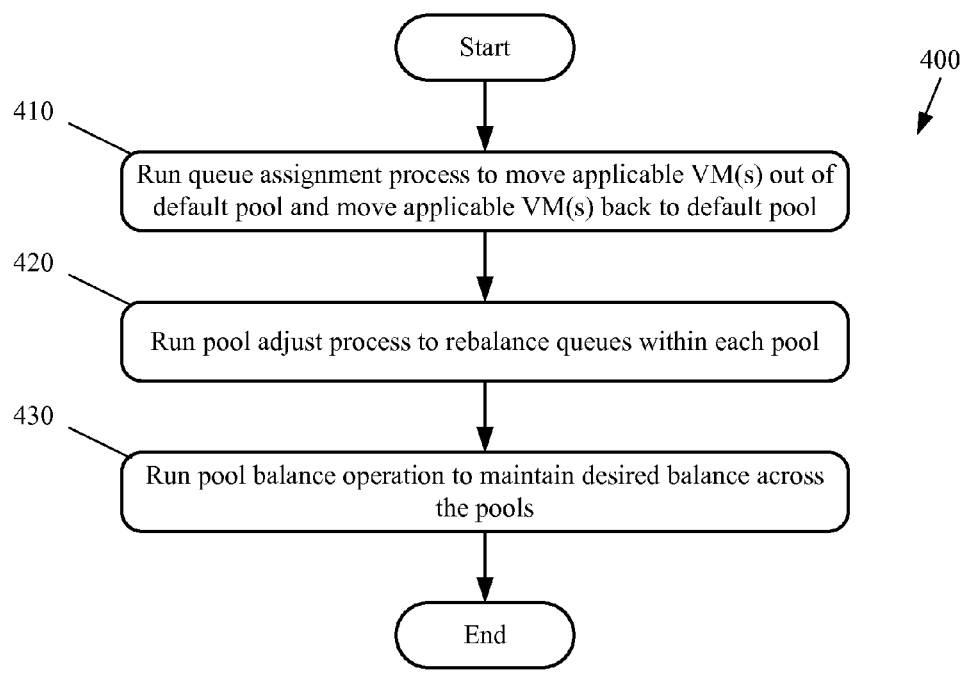
FIG. 4 conceptually illustrates an overall process that the load balancer performs in some embodiments.

FIG. 4 conceptually illustrates a process 400 that the load balancer 355 performs in some embodiments for assigning VMs to queues. The load balancer 355 in some embodiments performs this process periodically (e.g., every few seconds, few milliseconds, few micro-seconds, etc.) to assign VMs to queues, to rebalance queues within each pool and to maintain desired balance across the pools.

As shown in FIG. 4, the process 400 initially invokes (at 410) a queue assignment process (i.e., a process for assigning VMs to queues) that examines the VMs in the default pool to identify any VM that it has to move to a non-default pool, and moves any identified VM to the appropriate non-default queue in the non-default pool. In some embodiments, the queue assignment process moves (at 410) a VM to a non-default queue when the VM's use of a default queue exceeds a threshold level for the default queue or for the VM's use of the default queue. At 410, the process also identifies any VM in a non-default queue that has to move back to the default pool, and moves back to the default pool any identified VM. In some embodiments, the queue assignment process moves (at 410) a VM back to the default pool when the VM's use of its non-default queue is below a threshold level for the non-default queue or the VM's use of the non-default queue. The queue assignment process of some embodiments is further described below by reference to FIG. 9.

After invoking the queue assignment process, the process 400 invokes (at 420) a pool adjustment process to rebalance queues within each pool. In some embodiments, the pool adjustment process examines each pool to determine whether it has to move one or more VMs between queues in the pool or create a new queue in the pool and assign a VM to the new pool based on one or more optimization criteria for the pool. The pool adjustment process of some embodiments uses different optimization criteria for different pools. For instance, in some embodiments, the optimization criteria for a pool biases the process to distribute the VMs across the queues of the pool (e.g., for an LLR pool). In some embodiments, the optimization criteria for a pool biases the process to aggregate the VMs onto fewer queues in the pool (e.g., for an HLT pool). Based on these criteria and its determinations at 420, the process 400 re-assigns (at 420) VMs between queues in a pool or to a new queue in the pool.

Next, at 430, the process 400 invokes a pool balancing process that maintains the desired balance across the pools. In some embodiments, the pool balancing process examines the utilization of queues across the various pools. Based on this examination, the balancing process may allocate one or more queues to one pool. It may also de-allocate one or more queues from a pool based on this examination. In one invocation, this process may allocate (i.e., assign) more queues to more than one pool, or it might de-allocate queues (i.e., remove a previously assigned queue) in more than one pool. The process 400 then ends.

One of ordinary skill will realize that the load balancing process 400 is different for different embodiments. For instance, in some embodiments, the process 400 does not have a separate rebalancing operation 430, but rather performs this operation implicitly or explicitly as part of the operations 410 and 420. Also, while certain sub-operations are explained above and below as being part of one of the operations 410, 420, and 430, one of ordinary skill will realize that these sub-operation can be performed in different ones of these operations 410, 420, or 430, or as different operations on their own or as sub-operations of different operations.

IV. Matching NUMA Nodes

A. Unmatched NUMA Nodes

In some embodiments, the load balancer initially assigns VMs to queues without regard for the respective NUMA nodes used by the queues and the VMs. Although the following figures illustrate systems with two NUMA nodes, one of ordinary skill in the art will realize that some embodiments assign more than two NUMA nodes to various tasks and that the assignment system of some embodiments is applied to systems with any number of NUMA nodes. Furthermore, while the following figures illustrate at most two network queues per NUMA node, in some embodiments any number of network queues can be assigned to a particular NUMA node.

Figure 5:
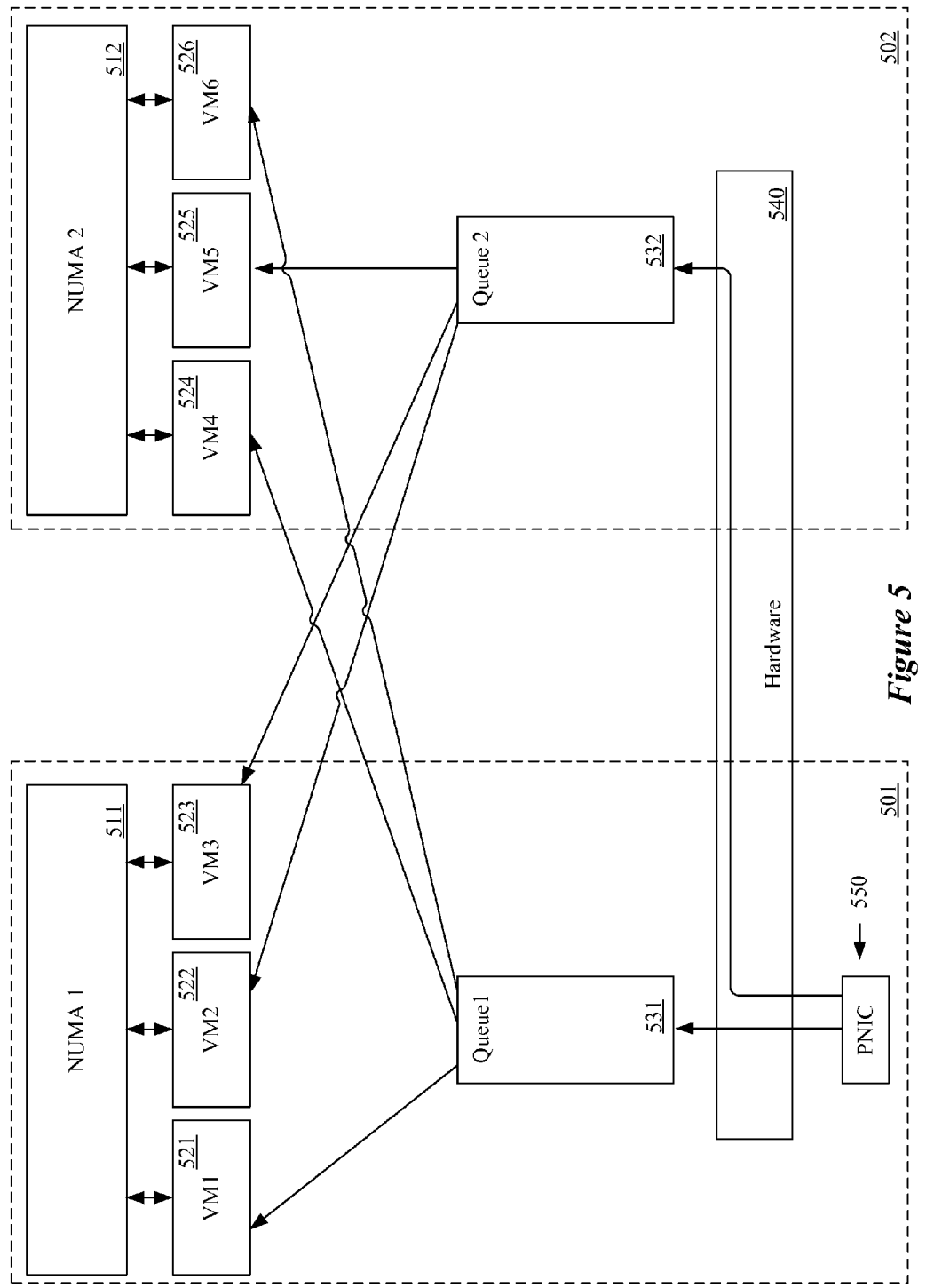
FIG. 5 conceptually illustrates a set of VMs assigned to multiple queues without regard to NUMA nodes.

FIG. 5 conceptually illustrates a set of VMs assigned to multiple queues without regard to NUMA nodes. The figure includes NUMA node groups 501 and 502, NUMA nodes 511 and 512, VMs 521-526, queues 531 and 532, hardware 540, and PNIC 550.

NUMA node groups 501 and 502 conceptually illustrate processes and VMs assigned to use a particular NUMA node. NUMA node group 501 identifies the queue 531 and VMs 521-523 as being assigned to use NUMA node 511. NUMA node group 501 also identified the PNIC 550 as being assigned to NUMA node 511. NUMA nodes 511 and 512 each represent a processor and its local memory used to implement processes and virtual machines on a host machine.

Queues 531 and 532 manage traffic between the VMs 521-526 and the PNIC 550. The hardware 540 of the host machine provides the physical connections between the PNIC 550 and the circuits of the host machine that implement the queues 531 and 532. PNIC 550 sends traffic to and receives traffic from a network outside the host machine.

VMs 521-526 are virtual machines implemented on the host machine. Each virtual machine 521-526 is assigned to a particular NUMA node of the host machine and to a particular queue. Virtual machine 521 is assigned to use NUMA node 511 and queue 531. Virtual machine 522 is assigned to use NUMA node 511 and queue 532. Virtual machine 523 is assigned to use NUMA node 511 and queue 532. Virtual machine 524 is assigned to use NUMA node 512 and queue 531. Virtual machine 525 is assigned to use NUMA node 521 and queue 532. Virtual machine 526 is assigned to use NUMA node 512 and queue 531. In this allocation of virtual machines to queues, only VMs 521 and 525 are assigned to the same NUMA nodes as their respective queues. In contrast VMs 522, 523, 524, and 526 are all assigned to NUMA nodes that are different from the NUMA nodes of their assigned queues. As a result of the VMs being assigned to NUMA nodes different from the NUMA nodes of their associated queues, the transmission of data between the VMs and the network experiences delays that do not occur for VMs on the same NUMA nodes as their associated queues.

Figure 6:
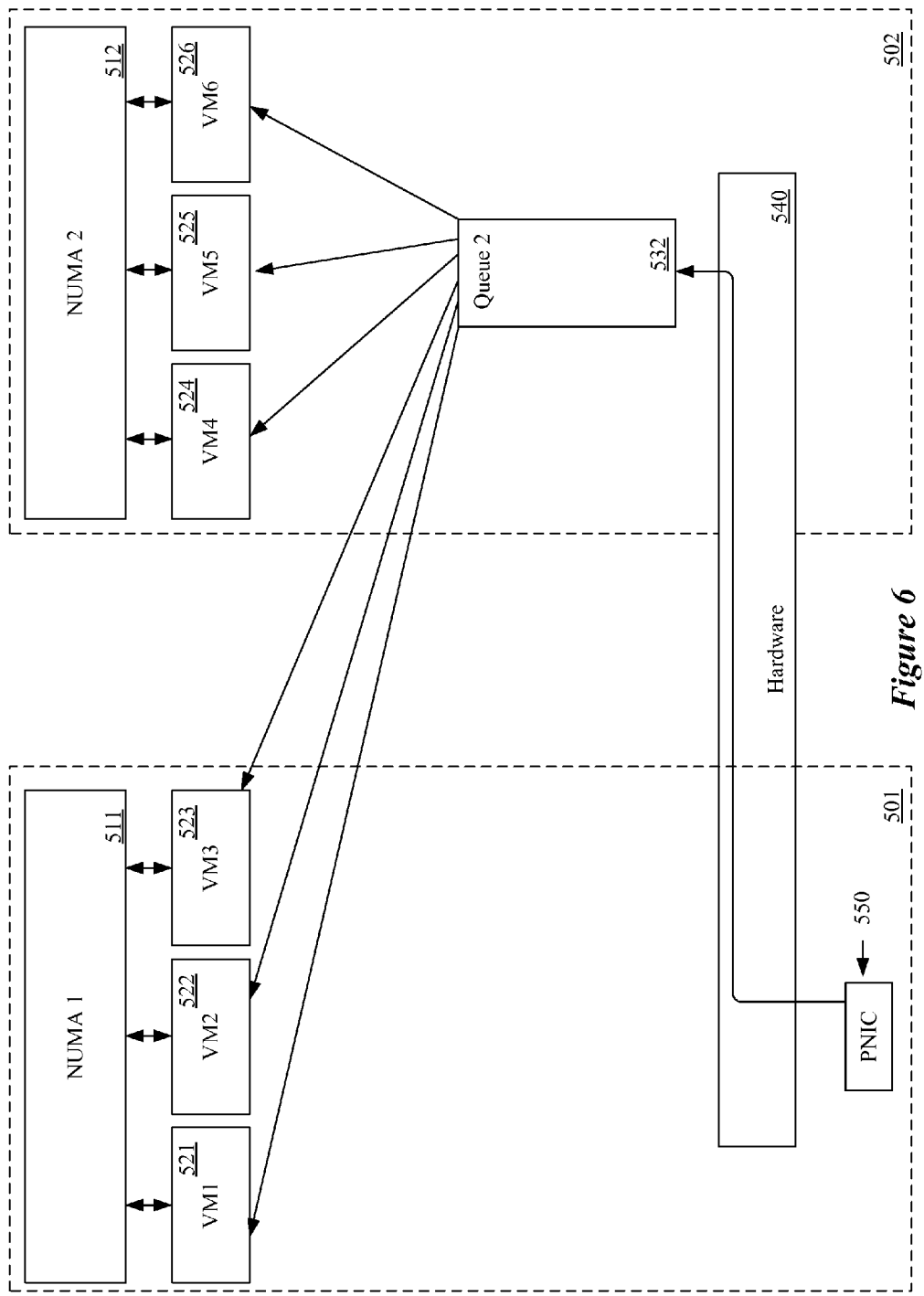
FIG. 6 conceptually illustrates a set of VMs assigned to a single queue without regard to NUMA nodes.

FIG. 6 conceptually illustrates a set of VMs assigned to a single queue without regard to NUMA nodes. The figure includes the same elements as FIG. 5, except that the queue 531 is not implemented. Accordingly, all network traffic to and from the VMs 521-526 passes through the queue 532. Queue 532 is assigned to NUMA node 512, as are VMs 524-526. As VMs 524-526 are assigned to the same NUMA node as their associated queue 532, the transmission of data between those VMs and the PNIC 550 does not experience delays related to using different NUMA nodes. VMs 521-523 are assigned to NUMA node 511. As VMs 521-523 are assigned to a different NUMA node from their associated queue 532, the transmission of data between those VMs and PNIC 550 does experience delays related to using different NUMA nodes. Furthermore, PNIC 550 is assigned to a different NUMA node than the queue 532. Because the PNIC 550 and the queue 532 are on different NUMA nodes, transmission of data between the PNIC 550 and queue 532 results in additional delays compared to transmission of data from queue 531 to PNIC 550 in FIG. 5.

B. Matched NUMA Nodes

Figure 7:
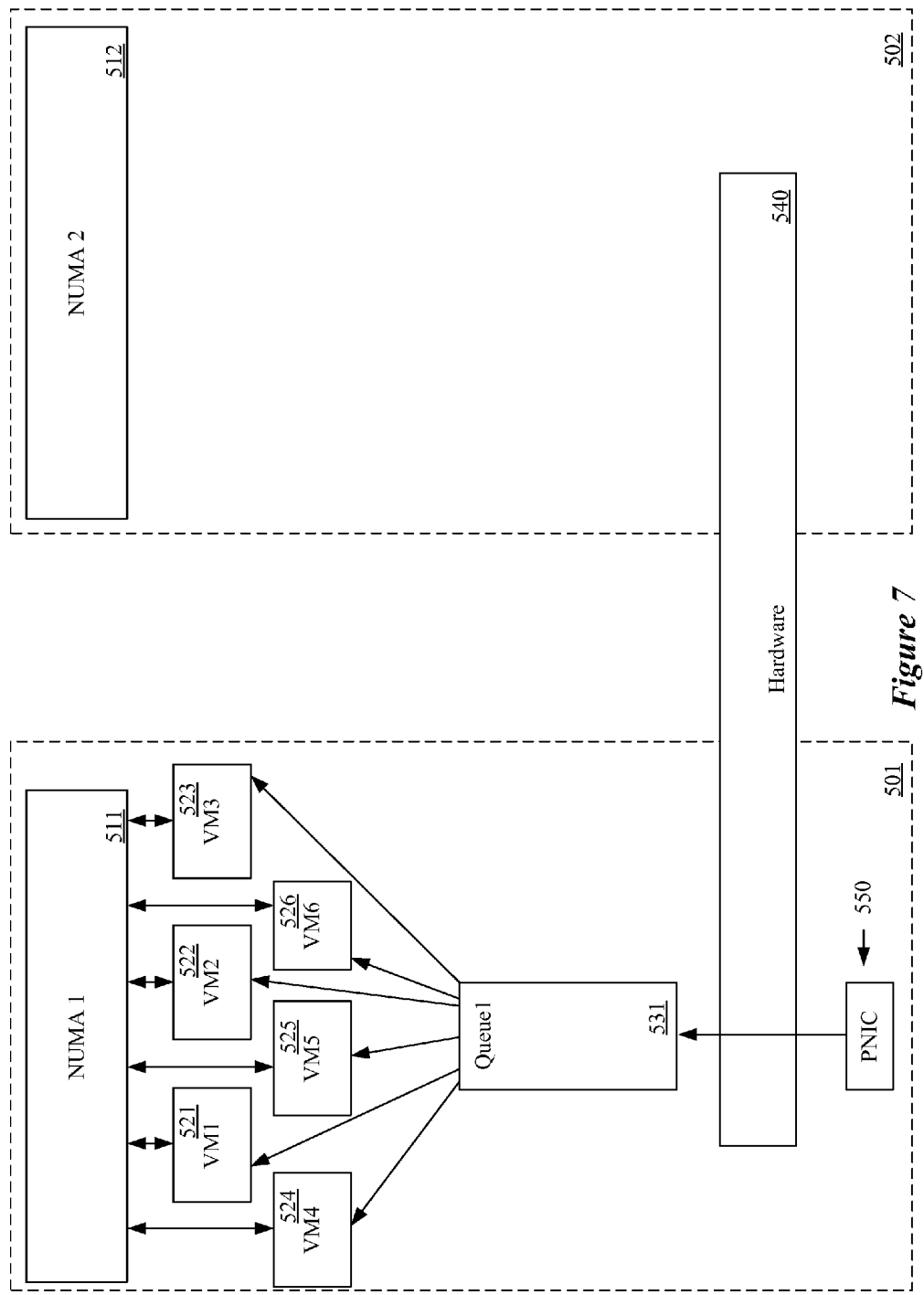
FIG. 7 conceptually illustrates a set of VMs assigned to a single queue on the same NUMA node as both the VMs and the PNIC served by the queues.

Some embodiments match VMs on a particular NUMA node with queues on the same NUMA node. A host machine achieves the highest overall efficiency (with respect to NUMA node assignments) in transmitting data from VMs to a network when all VMs and queues are on the same NUMA node as the PNIC. FIG. 7 conceptually illustrates a set of VMs assigned to a single queue 531 on the same NUMA node as both the VMs and the PNIC served by the queue 531. The figure includes the same elements as FIG. 5, except that the queue 532 is not implemented and all VMs 521-526 operate on the same NUMA node 511. Accordingly, all network traffic to and from the VMs 521-526 passes through the queue 531. Transmission of data from the VMs to the queue 531 and from the queue 531 to the PNIC 550 are each more efficient than transmissions between such elements on different NUMA nodes.

As described above, a host machine achieves the highest overall efficiency (with respect to NUMA node assignments) in transmitting data from VMs to a network when all VMs and queues are on the same NUMA node as the PNIC. PNICs can be installed in various slots on a motherboard of a server. For example PCIe PNICs can be assigned to various PCIe slots on the motherboard. In some embodiments, a PNIC's NUMA node is determined by which slot (e.g., which PCIe slot) the PNIC is installed in on the server motherboard. Each slot has its NUMA association and can't be changed. So in some embodiments, a PNIC's NUMA node can't be changed without physically moving the PNIC to a different slot. Accordingly, in some embodiments, the system determines the physically determined NUMA node of the PNIC (or in some embodiments, another physical device) and assigns all VMs and network queues to the same NUMA node as the PNIC (or other physical device) unless such an assignment is not desirable for some other reason (e.g., the NUMA node can't handle all the VMs and all the network queues).

In addition to using network queues with particular VMs assigned to them, the system of some embodiments provides a default queue that handles broadcast and/or multicast traffic (e.g., data packets addressed to multiple VMs, to all VMs, etc.). In some such embodiments, the system always implements the default queue on the NUMA node of the PNIC and further implements one or more non-default queues for the VMs to use for traffic addressed to particular VMs. For example, in some embodiments, both a default queue and a single non-default queue are implemented and assigned to the NUMA node of the PNIC.

Memory and processor related delays are lowest when all virtual machines, their associated queue(s) and the PNIC are on the same NUMA node. However, this condition is not always possible to achieve under all circumstances. For example, there are limits to how many VMs a particular NUMA node can process at the same time. Accordingly, some embodiments provide NUMA node assignments that use multiple NUMA nodes. In some embodiments, when metrics of resource use of network queues on a single NUMA node (e.g., as shown in FIG. 7) or performance metrics meet some threshold metric, and/or is predicted to exceed some threshold metric, the VMs are split up between network queues on multiple NUMA nodes. In some embodiments, a virtual machine is assigned (or re-assigned) to a different NUMA node than the existing VMs and the system implements a new network queue assigned to the same NUMA node as the newly assigned (or re-assigned) VM when a threshold metric is met.

Figure 8:
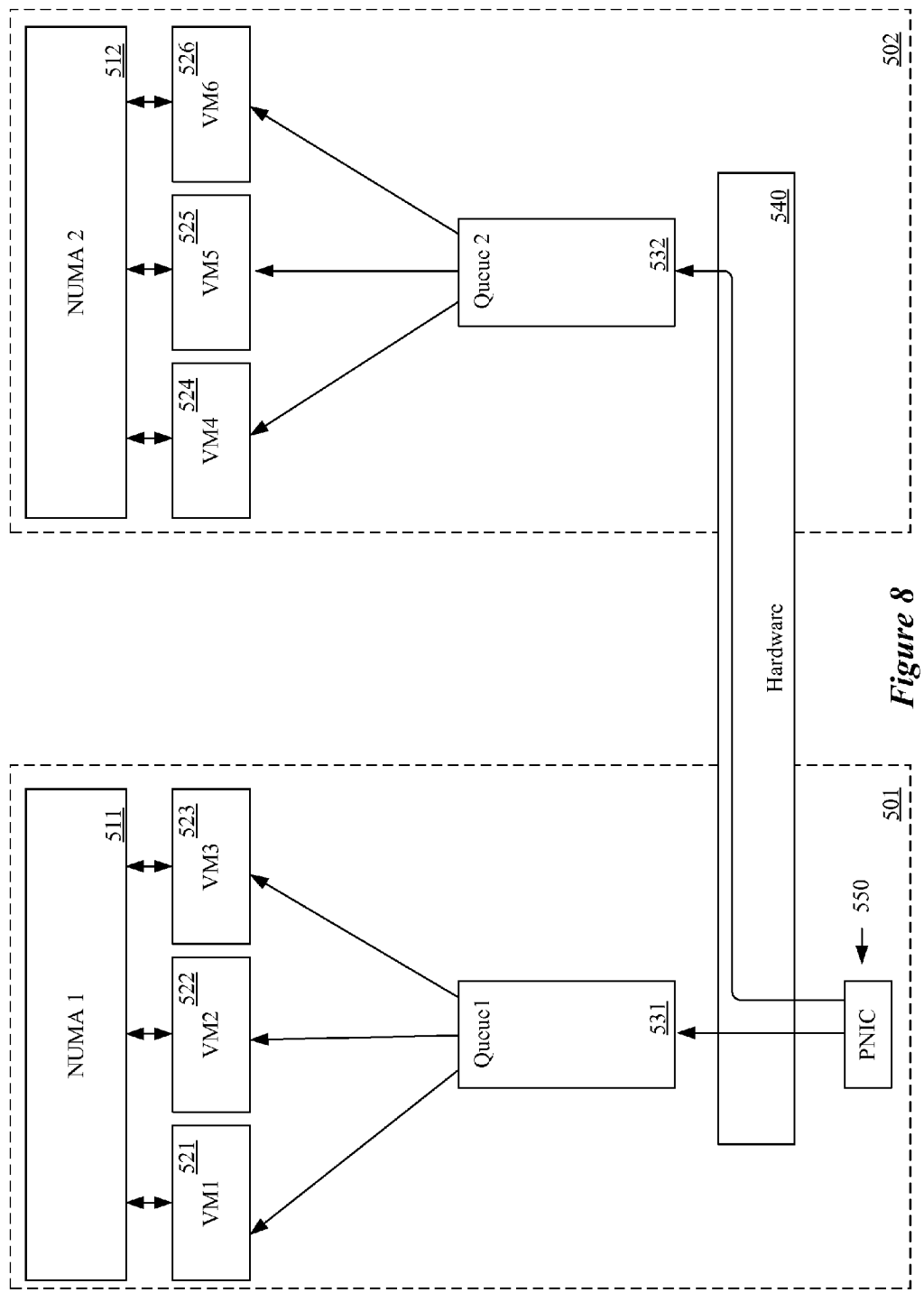
FIG. 8 conceptually illustrates a set of VMs assigned to multiple queues on the same NUMA node as both the VMs and the PNIC served by the queues.

FIG. 8 conceptually illustrates a set of VMs assigned to multiple queues on the same NUMA node as both the VMs and the PNIC served by the same queues. The figure includes the same elements as FIG. 5. However, rather than each VM 521-526 being randomly assigned to a network queue, as in FIG. 5, each VM is assigned to a queue on the same NUMA node as the VM. Accordingly, all network traffic to and from the VMs 521-523 passes through the queue 531, all of which are on the NUMA node 511 and all network traffic to and from the VMs 524-526 passes through the queue 532, all of which are on NUMA node 512. Transmissions of data from VMs 521-523 to the network are the most efficient, as NUMA node 511 is the NUMA node of all elements in the communications chain (including the PNIC 550) out of the host system to a network. Transmissions of data from VMs 524-526 to the network are less efficient than transmissions from VMs 521-523, because the PNIC 550 uses a different NUMA node 511 than the NUMA node 512 of the queue 532. However, transmissions of data from VMs 524-526 to the network are more efficient than they would be if the VMs 524-526 used a different NUMA node than the queue to which they were assigned.

C. Overflow Queues

Network queues have finite amounts of various resources available. In some embodiments, these resources include one or more of available bandwidth, maximum achievable packet rate, and available CPU cycles. Similarly, the network queues will not work satisfactorily when certain performance levels are too high or too low. For example, in some embodiments, latency may be too high for smooth operation of the network queue or throughput may be too low. In some embodiments, the metric of the use of one or more resources and/or the state of one or more performance metrics of a network queue determine whether the network queue will be split up (e.g., whether the VMs will be re-assigned to another network queue and/or whether newly implemented VMs will be assigned to an existing network queue or to a new network queue).

In some embodiments, when a network queue is meeting a threshold metric (e.g., using more than some percentage, such as 85%, 90%, etc. of the available bandwidth, causing a higher than threshold latency to be detected, etc.), a queue assignor (e.g., a load balancer of the host machine) implements a new network queue for additional VMs. Similarly, in some embodiments, when more than a threshold amount of a resource of a network queue is used by multiple VMs or when another threshold metric is met (e.g., network speed of a VM drops below a threshold metric), one or more of the VMs already assigned to that queue are moved to another queue (e.g., on the same NUMA node or a different NUMA node). The queue to which these "overflow" VMs are assigned are referred to herein as overflow queues.

Figure 9:
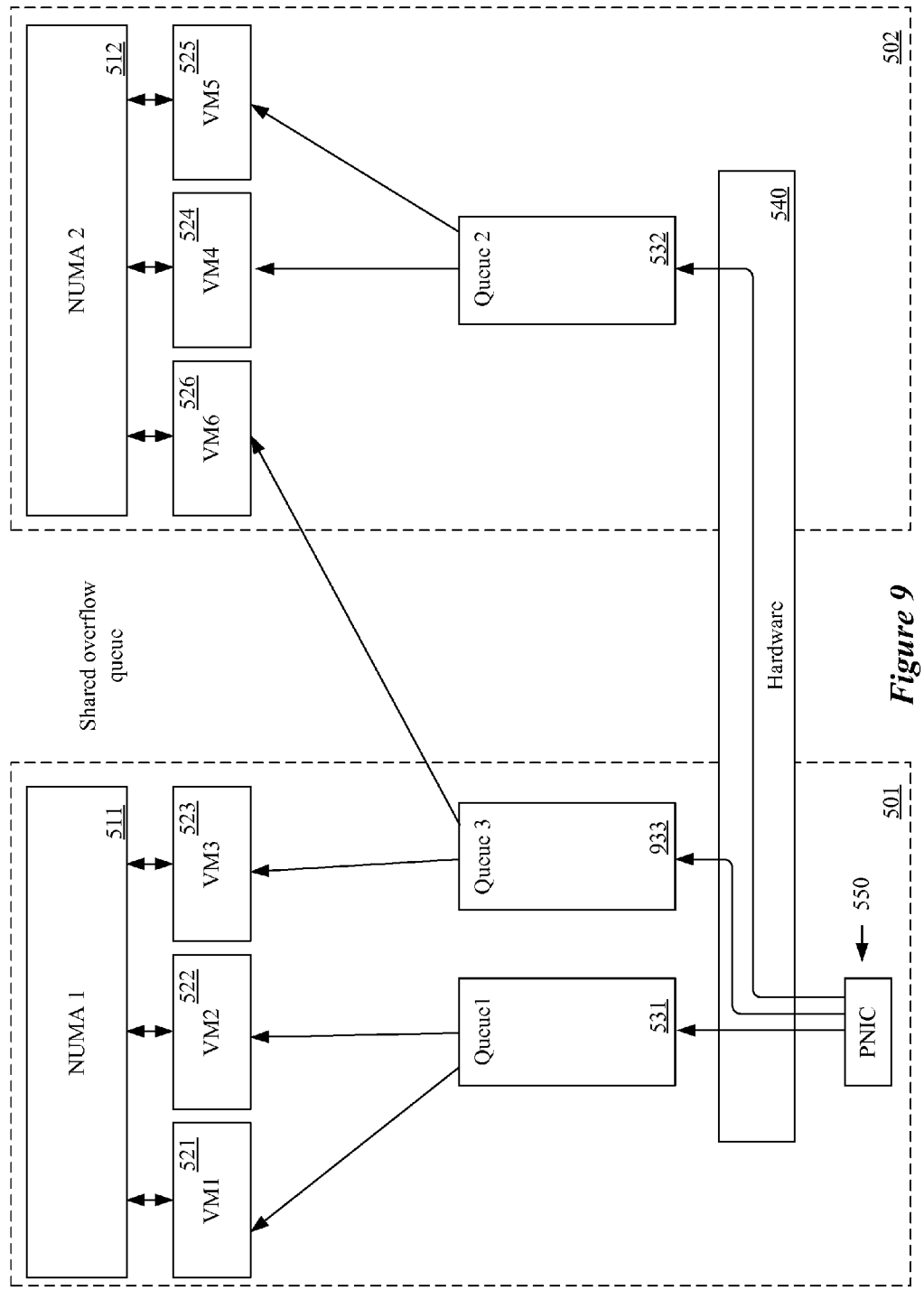
FIG. 9 illustrates an embodiment that provides a single overflow queue on a single NUMA node for overflow VMs on multiple NUMA nodes.

For some embodiments, FIG. 9 illustrates a system (e.g., a host machine or hypervisor) that provides a single overflow queue on a single NUMA node for overflow VMs on multiple NUMA nodes. The figure includes all the elements of FIG. 5 and an overflow queue 933. In FIG. 9, VMs 521 and 522 are using more than a threshold amount of an available resource of queue 531 (e.g., transmitting and/or receiving more than a threshold amount of the available bandwidth of queue 531) or meeting some other metric (e.g., latency exceeds a threshold level). Similarly, VMs 524 and 525 are using more than a threshold amount of an available resource of queue 532 (e.g., transmitting and/or receiving more than a threshold amount of the available bandwidth of queue 532) or meeting some other metric (e.g., latency exceeds a threshold level). Accordingly, the system (e.g., the load balancer of the host) assigns VMs 523 and 526 to the overflow queue 933. Assigning all overflow VMs to one queue has the advantage of not leaving multiple almost empty queues on multiple NUMA nodes. However, the transmission speed for data from VM 526 is slower than it would be if VM 526 were transmitting data through a queue on the same NUMA node as itself, because the VM 526 is running on a different NUMA node (512) than the overflow queue 933 (running on NUMA node 511).

Figure 10:
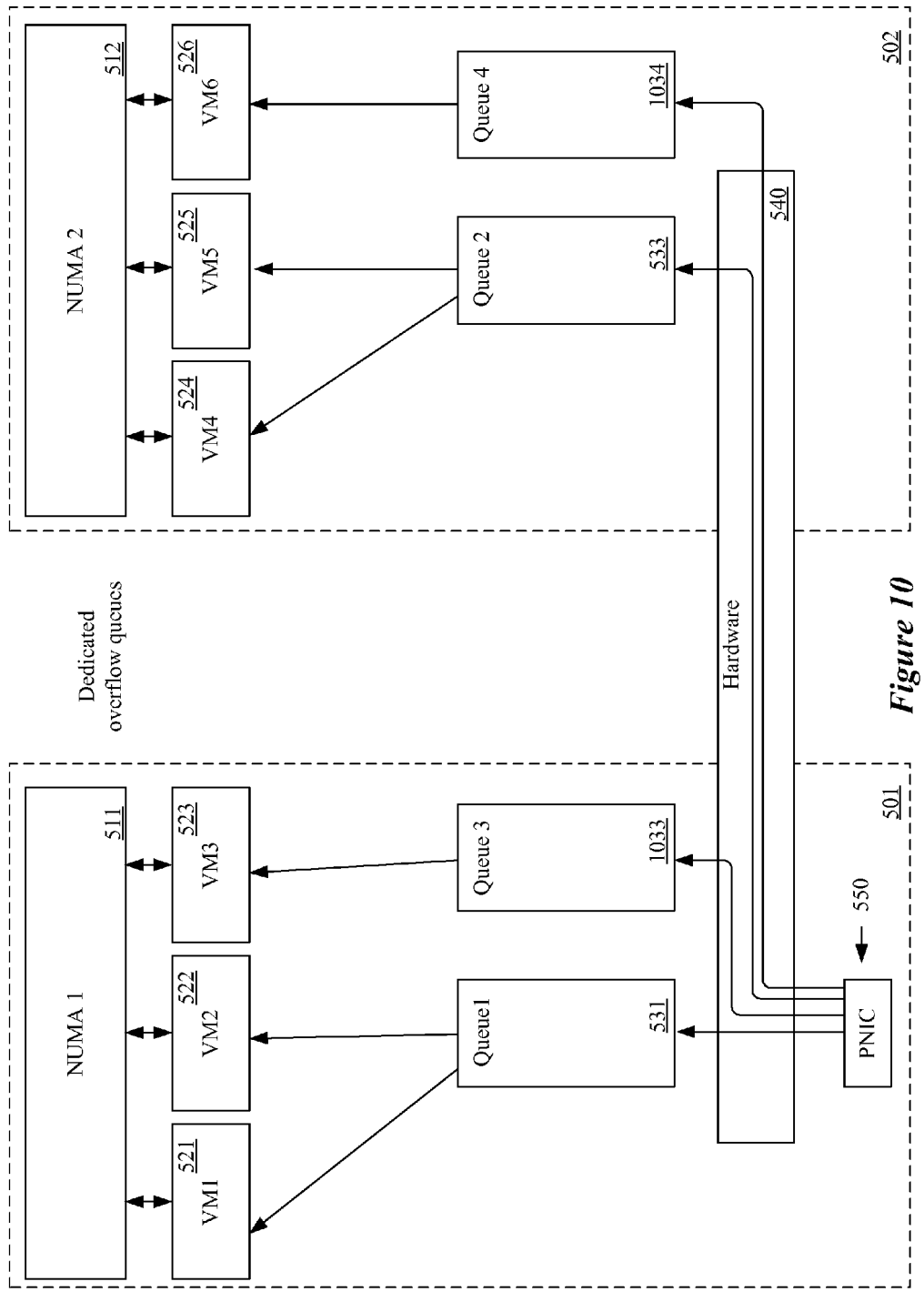
FIG. 10 illustrates an embodiment that provides a separate overflow queue on each of multiple NUMA nodes with overflow VMs.

For some embodiments, FIG. 10 illustrates a system (e.g., a host machine or hypervisor) that provides a separate overflow queue on each of multiple NUMA nodes with overflow VMs. The figure includes all the elements of FIG. 5 and overflow queues 1033 and 1034. In FIG. 10, VMs 521 and 522 are using more than a threshold amount of an available resource of queue 531 (e.g., transmitting and/or receiving more than a threshold amount of the available bandwidth of queue 531) or meeting some other metric (e.g., latency exceeds a threshold level). Similarly, VMs 524 and 525 are using more than a threshold amount of an available resource of queue 532 (e.g., transmitting and/or receiving more than a threshold amount of the available bandwidth of queue 532) or meeting some other metric (e.g., latency exceeds a threshold level). For some of these embodiments, each NUMA node with an overflow VM is allocated an overflow queue. Accordingly, the system (e.g., the load balancer of the host) assigns VM 523 to the overflow queue 1033 and VM 526 to the overflow queue 1034. Assigning all overflow VMs on a NUMA node to an overflow queue of that NUMA node has the advantage of providing faster transmission of data for VMs that would otherwise be using queues on NUMA nodes other than their own. However, the overflow queues on one or more NUMA nodes may be used at well below their maximum available resource usage (or performance metrics may not meet a threshold metric) in cases where only a small number of overflow VMs are assigned to a NUMA node.

V. Processes for Matching NUMA Nodes

A. Processes Performed by a Load Balancer in Some Embodiments

In some embodiments, one or more processes operate to assign VMs to network queues. In some embodiments, these processes are biased towards assigning the VMs to network queues on the same NUMA nodes as the VMs. In some embodiments, a load balancer assigns virtual machines to particular network queues, splits queues that are too full (e.g., when the traffic of the VMs of a queue is over a threshold amount), and consolidates queues that are too empty (e.g., when the combined traffic of two or more queues is below a threshold level).

Figure 11:
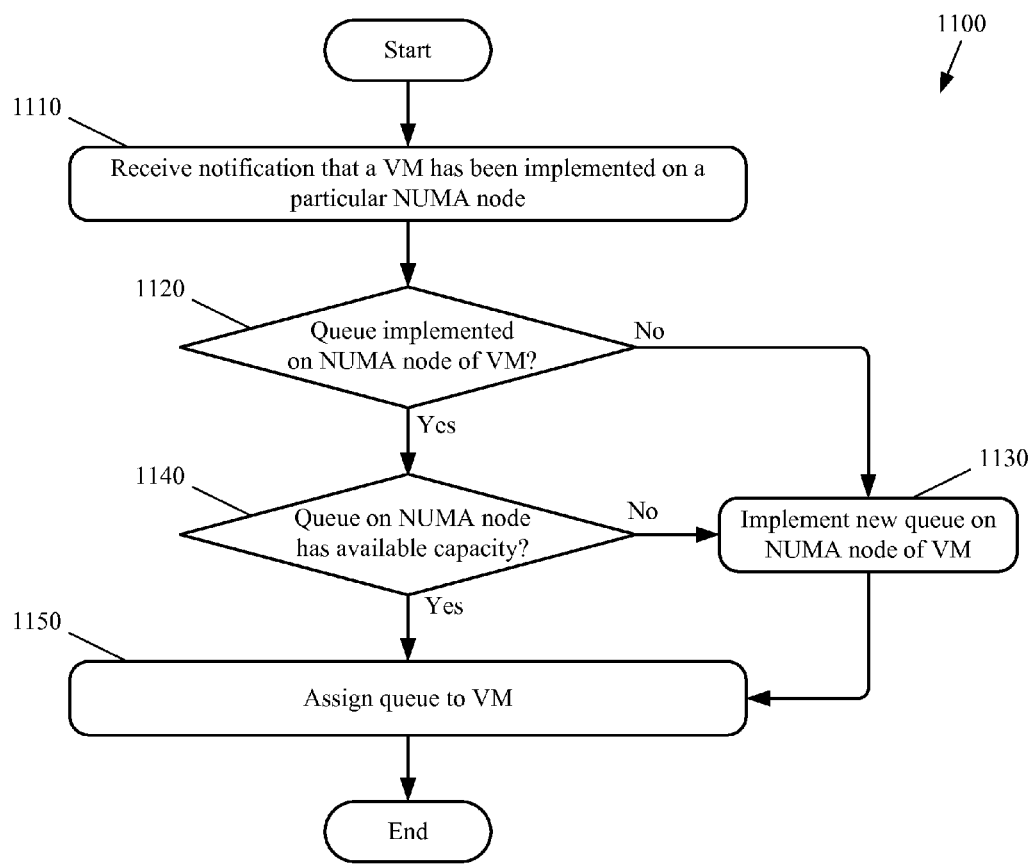
FIG. 11 conceptually illustrates a process of some embodiments that assigns VMs to network queues on the same NUMA node.

FIG. 11 conceptually illustrates a process 1100 of some embodiments that assigns VMs to network queues on the same NUMA node. In some embodiments, the process 1100 is performed by a load balancer. The process 1100 receives (at 1110) a notification that a VM has been implemented on a particular NUMA node (e.g., a notification from a scheduler). In some embodiments, the notification is sent each time a particular VM is assigned to a new NUMA node. For example, when a VM initially on a first NUMA node demands more processor cycles than are available on that NUMA node and a scheduler moves the VM to a new NUMA node, the load balancer receives a notification from the system that the VM is on the new NUMA node. Similarly, when a VM is newly implemented, the scheduler assigns it to a NUMA node. In some embodiments, the notification is a push notification (e.g., the system alerts the load balancer automatically). In other embodiments, the notification is a pull notification (e.g., the load balancer accesses data identifying the current NUMA nodes of all VMs on the host.

The process 1100 then determines (at 1120) whether a network queue is implemented on the NUMA node of the particular VM. When there is no network queue implemented on the NUMA node of the particular VM, the process 1100 proceeds to operation 1130, described below. When there is a network queue already implemented on the NUMA node of the particular VM, the process determines (at 1140) whether there is available capacity on any network queues currently operating on the NUMA node (e.g., whether there are sufficient resources for the particular VM in view of the actual or predicted resource usage of the other VMs on that NUMA node). When there is no network queue with available capacity implemented on that NUMA node, the process 1100 proceeds to operation 1130

As described above, when there is no network queue on a NUMA node of a VM or there is a NUMA node that is identified as lacking the capacity to handle another VM, the process 1100 implements operation 1130. The process 1100 implements (at 1130) a new network queue on the same NUMA node as the particular VM.

Once the new network queue has been implemented (at 1130) or once an existing network queue with available capacity has been identified, the process 1100 proceeds to operation 1150. The process 1100 assigns (at 1150) the particular VM to use the previously implemented network queue or the new network queue on that NUMA node.

Figure 12:
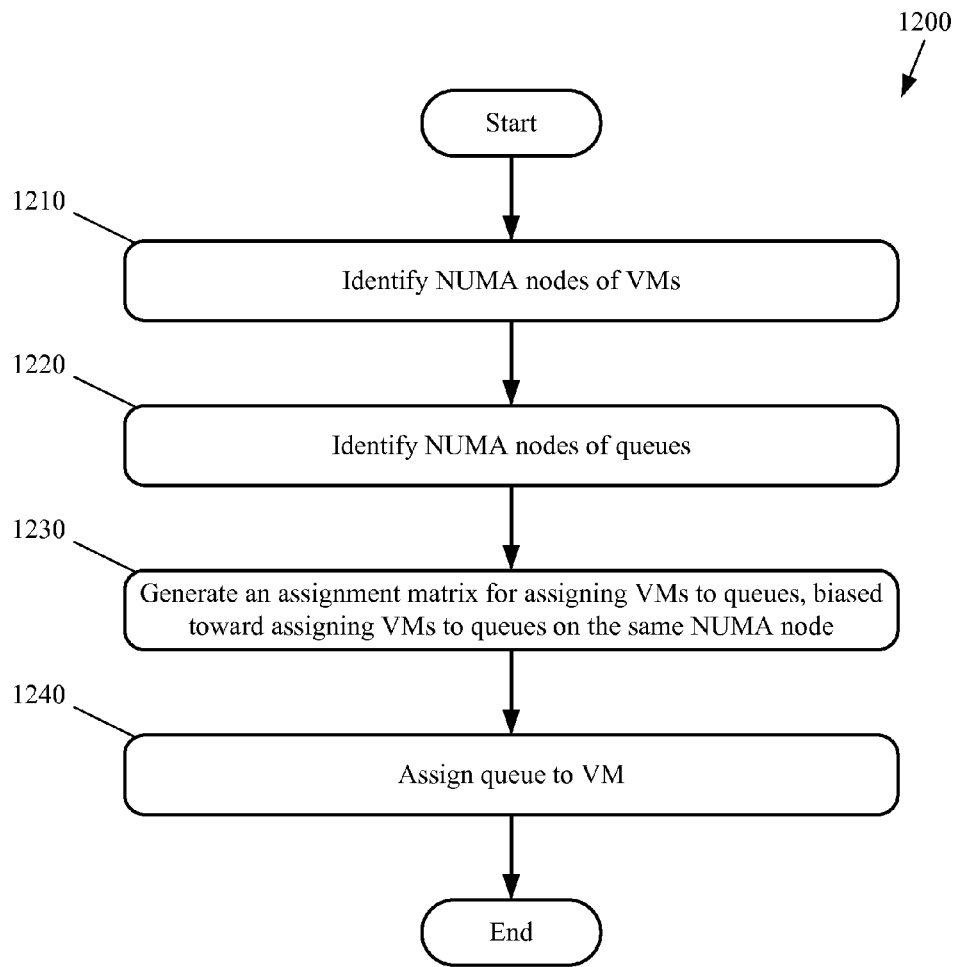
FIG. 12 conceptually illustrates a process for determining assignments of VMs to network queues that is biased toward matching NUMA nodes.

Process 1100 of FIG. 11 is described in terms of yes/no decisions and actions taken based on those specific decisions. However, in some embodiments, other considerations in addition to matching NUMA nodes are used to determine what VMs should be assigned to each queue. FIG. 12 conceptually illustrates a process 1200 for determining assignments of VMs to network queues that is biased toward assigning VMs to the same NUMA nodes as the network queues to which the VMs are assigned. The process 1200 identifies (at 1210) the NUMA nodes of the VMs on a host machine. The process 1200 then identifies (at 1220) the NUMA nodes of the network queues. The process then generates (at 1230) an assignment matrix for assigning the VMs to network queues. In some embodiments, the assignment matrix is a set of data correlating each VM with a particular network queue to which the VM is assigned.

The process of some embodiments uses various factors to determine which VMs to assign to which network queues (e.g., required quality of data connection, expected bandwidth usage, etc.). One of the factors that the process uses to determine which VMs to assign to which network queues is assignment of the respective NUMA nodes to the VMs and the network queues. The process is biased toward assigning VMs to network queues on the same NUMA nodes as the VMs. The process 1200 then assigns (at 1240) the VMs to the queues according to the generated assignment matrix.

In some embodiments, the network traffic generated by a particular VM varies over time. Accordingly, in some cases, a network queue that had been assigned a particular set of VMs when those VMs were producing little network traffic can become overloaded when one or more of the VMs increases its traffic. In some embodiments, when traffic through a particular network queue increases beyond a particular threshold level (e.g., 80% of capacity, 90% of capacity, etc.) the load balancer implements a new network queue on the same NUMA node as the particular network queue and re-assigns one or more of the VMs from the particular network queue to the new network queue. This is sometimes referred to as "splitting" a network queue.

Figure 13:
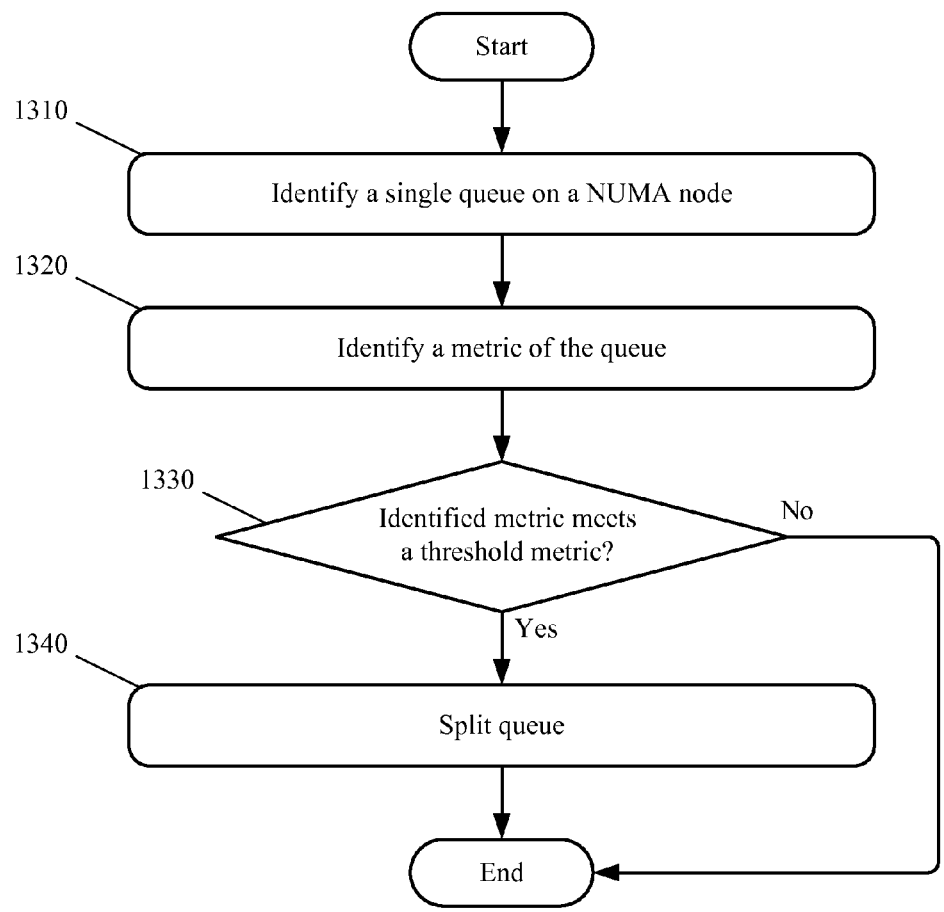
FIG. 13 conceptually illustrates a process of some embodiments for splitting a network queue.

FIG. 13 conceptually illustrates a process 1300 of some embodiments for splitting a network queue. In some embodiments, the process 1300 is performed by a load balancer. The process 1300 identifies (at 1310) a single queue on a NUMA node with multiple VMs assigned to the queue. The process 1300 identifies (at 1320) one or more metrics which can be compared to threshold metrics, e.g., metrics of a total usage of various resources by the queue (e.g., bandwidth usage to and/or from the VMs assigned to the queue), a performance metric, etc. The process 1300 determines (at 1330) whether the metrics meet a threshold metric. If the metrics do not meet the threshold metric, the process 1300 ends. If the metrics meet the threshold metric, the process 1300 splits (at 1340) the queue (e.g., implements a new queue on the same NUMA node as the single queue and re-assigns some of the VMs from the single queue to the new queue.

Figure 14:
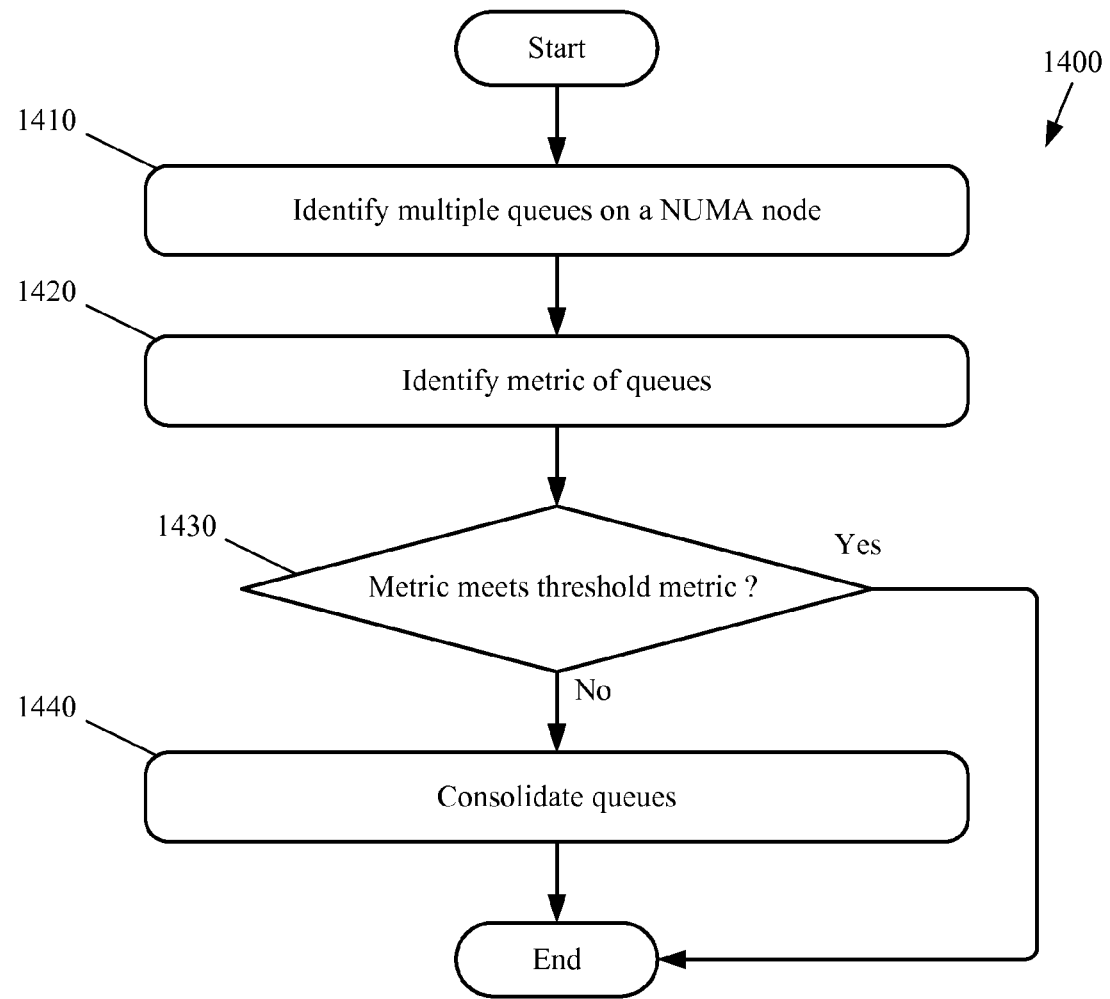
FIG. 14 conceptually illustrates a process of some embodiments for consolidating a set of network queues.

In contrast, in some cases, a set of network queues on a NUMA node that had been assigned particular sets of VMs when those VMs were producing a high level of network traffic can become underutilized when one or more of the VMs decreases its traffic. In some embodiments, when traffic through a particular set of network queues decreases below a particular threshold level for a single network queue (e.g., 70% of capacity, 80% of capacity, etc.) the load balancer consolidates the network queues. To consolidate the network queues, the load balancer re-assigns all the VMs from one or more of the set of network queues to a single network queue, and then eliminates the now empty queue(s). FIG. 14 conceptually illustrates a process 1400 of some embodiments for consolidating a set of network queues.

The process 1400 identifies (at 1410) multiple queues on a NUMA node with multiple VMs assigned to the queues. The process 1400 identifies (at 1420) a metric related to the queues of the NUMA node, to and/or from the VMs assigned to those queues. The process 1400 determines (at 1430) whether the metric meets a threshold metric for a single queue. When the metric meets the threshold metric, the process 1400 ends. When the metric does not meet the threshold metric, the process 1400 consolidates (at 1440) the queues.

In the above description of assignments of network queues to NUMA nodes, each VM is characterized as being assigned to a single NUMA node. However, in some embodiments, the scheduler can assign a virtual machine to use multiple virtual central processing units (VCPUs). In some such embodiments, two or more different NUMA nodes of the host machine hosting the VM may implement the VCPUs assigned to a single VM. In some embodiments, the load balancer will be biased toward assigning each VM to use a network queue that uses a NUMA node that is assigned to at least one of the VCPUs of the VM. In some embodiments, the load balancer will be biased toward assigning each VM to use a network queue that uses a NUMA node to which a plurality of the VCPUs of the VM are assigned.

B. Processes Performed by a Scheduler in Some Embodiments

In some embodiments, a scheduler determines the assignment of VMs to NUMA nodes. The scheduler of some embodiments generates the assignments of VMs with a bias toward assigning VMs to the NUMA nodes of the network queues to which the VMs are assigned.

Figure 15:
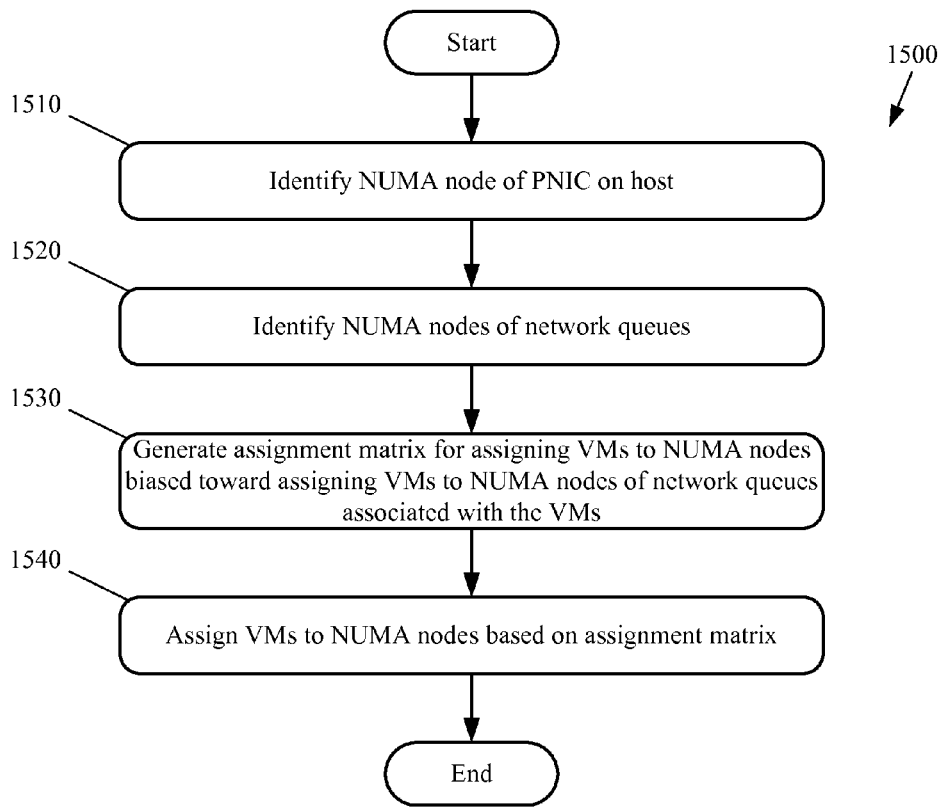
FIG. 15 conceptually illustrates a process for determining assignments of VMs to NUMA nodes that is biased toward matching NUMA nodes of VMs with NUMA nodes of network queues.

FIG. 15 conceptually illustrates a process 1500 for determining assignments of VMs to NUMA nodes that is biased toward matching NUMA nodes of VMs with NUMA nodes of network queues.

The process 1500 identifies (at 1510) the NUMA node of a PNIC of a host machine. The process 1500 then identifies (at 1520) the NUMA nodes of existing network queues. The process then generates (at 1530) an assignment matrix for assigning the VMs to NUMA nodes. The process of some embodiments uses various factors to determine which VMs to assign to which NUMA nodes (e.g., expected processing load, expected memory usage, etc.). Some of the factors that the process uses to determine which VMs to assign to which NUMA nodes are the respective NUMA nodes of the PNIC and the existing network queues. The process is biased toward assigning VMs to the NUMA node of the PNIC and to the NUMA nodes of existing network queues. The process 1500 then assigns (at 1540) the VMs to NUMA nodes according to the generated assignment matrix.

In the above description of assignments of VMs to NUMA nodes, each VM is assigned to a single NUMA node. However, in some embodiments, the scheduler can assign a virtual machine to use multiple virtual central processing units (VCPUs). In some such embodiments, two or more different NUMA nodes of the host machine hosting the VM may implement the VCPUs assigned to a single VM. In some embodiments, the scheduler will be biased toward assigning at least one of the VCPUs of a VM to the same NUMA node as the network queue to which the VM is assigned. In some embodiments, the scheduler will be biased toward assigning as many VCPUs of a VM as possible to operate on the same NUMA node as the network queue to which the VM is assigned.

The above description characterizes two processes, the load balancer and the scheduler, as implementing separate functions. The load balancer assigns VMs to queues and manages the queues. The scheduler assigns the VMs to NUMA nodes. In some embodiments, the scheduler does not coordinate its assignments with the load balancer. However, in some embodiments the scheduler coordinates its assignments of VMs to NUMA nodes with the load balancer's assignment of VMs to queues. In still other embodiments, the functions of the load balancer and scheduler are performed by different processes or performed by a single process. In some embodiments, both the scheduler and the load balancer are processes that are part of an infrastructure application or operating system of a host machine (e.g., a hypervisor) that manages communications between VMs, migration of VMs to other host systems, TCP/IP stack processing, etc.

VI. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement the processes described herein is within the scope of the invention. In some embodiments, the programs, when installed to operate on one or more electronic systems, define one or more specific machine implementations that execute and perform the operations of the software programs.

Figure 16:
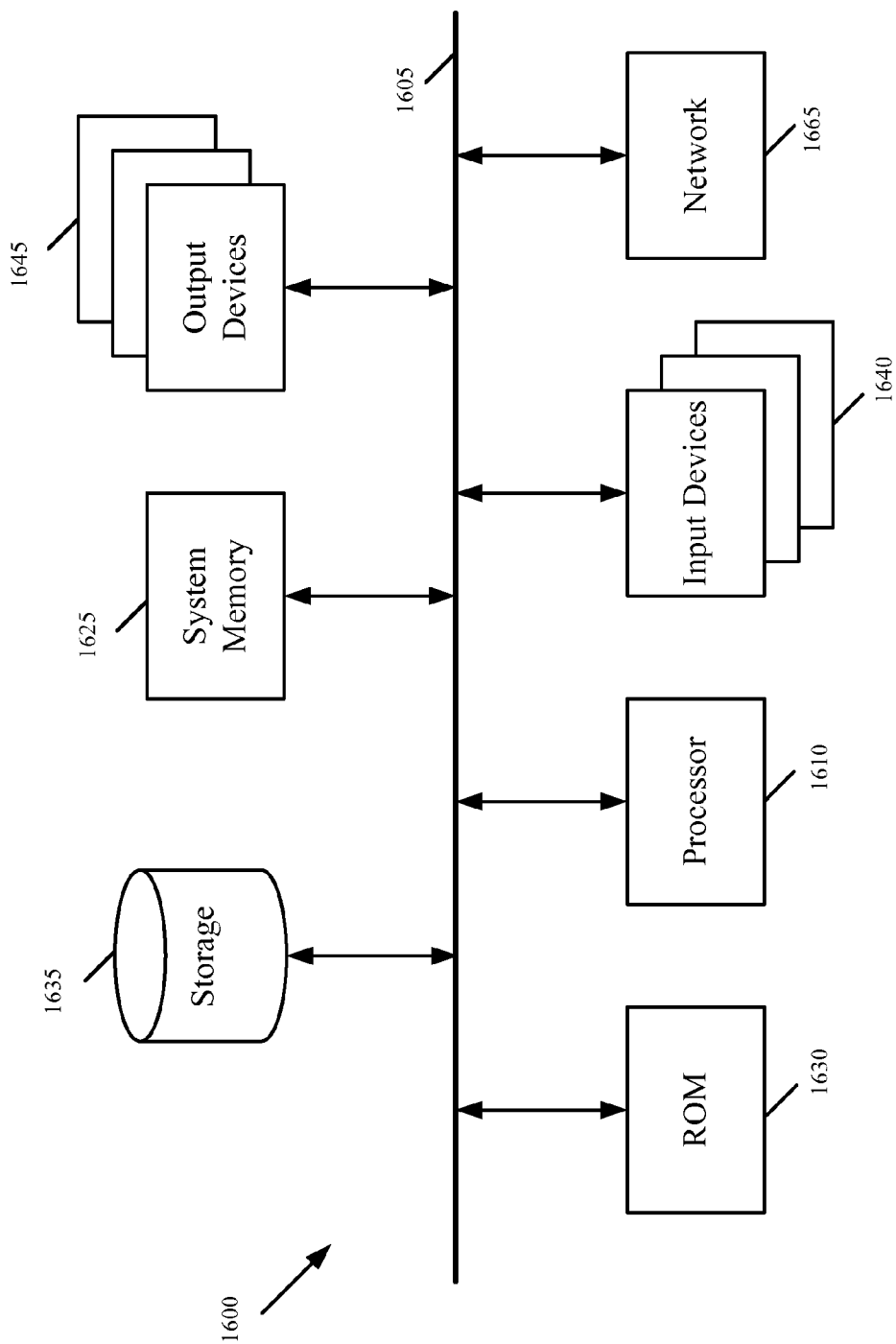
FIG. 16 conceptually illustrates an electronic system with which some embodiments of the invention are implemented.

FIG. 16 conceptually illustrates an electronic system 1600 with which some embodiments of the invention are implemented. The electronic system 1600 can be any of the host devices described above. This system can be any of the devices executing any of the processes and/or queue management systems described above. The electronic system 1600 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1600 includes a bus 1605, processing unit(s) 1610, a system memory 1625, a read-only memory 1630, a permanent storage device 1635, input devices 1640, and output devices 1645.

The bus 1605 collectively represents all system, peripheral, and chipset buses that communicatively connect the numerous internal devices of the electronic system 1600. For instance, the bus 1605 communicatively connects the processing unit(s) 1610 with the read-only memory 1630, the system memory 1625, and the permanent storage device 1635.

From these various memory units, the processing unit(s) 1610 retrieve instructions to execute and data to process in order to execute the processes of the invention. The processing unit(s) may be a single processor or a multi-core processor in different embodiments.

The read-only-memory (ROM) 1630 stores static data and instructions that are needed by the processing unit(s) 1610 and other modules of the electronic system. The permanent storage device 1635, on the other hand, is a read-and-write memory device. This device is a non-volatile memory unit that stores instructions and data even when the electronic system 1600 is off. Some embodiments of the invention use a mass-storage device (such as a magnetic or optical disk and its corresponding disk drive) as the permanent storage device 1635.

Other embodiments use a removable storage device (such as a floppy disk, flash drive, etc.) as the permanent storage device. Like the permanent storage device 1635, the system memory 1625 is a read-and-write memory device. However, unlike storage device 1635, the system memory is a volatile read-and-write memory, such a random access memory. The system memory stores some of the instructions and data that the processor needs at runtime. In some embodiments, the invention's processes are stored in the system memory 1625, the permanent storage device 1635, and/or the read-only memory 1630. From these various memory units, the processing unit(s) 1610 retrieve instructions to execute and data to process in order to execute the processes of some embodiments.

The bus 1605 also connects to the input and output devices 1640 and 1645. The input devices enable the user to communicate information and select commands to the electronic system. The input devices 1640 include alphanumeric keyboards and pointing devices (also called "cursor control devices"). The output devices 1645 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 16, bus 1605 also couples electronic system 1600 to a network 1665 through a network adapter (not shown). In this manner, the computer can be a part of a network of computers (such as a local area network ("LAN"), a wide area network ("WAN"), or an Intranet, or a network of networks, such as the Internet. Any or all components of electronic system 1600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 4 and 11-15) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

We claim:
1. A method comprising:
identifying a plurality of non-uniform memory access (NUMA) nodes, one of the plurality of NUMA nodes being a NUMA node having a physical network interface card (PNIC);
generating an assignment for a virtual machine (VM) to a NUMA node of the plurality of identified NUMA nodes, said generating is biased toward assigning the VM to the NUMA node having the PNIC; and
using the generated assignment to assign the VM to the NUMA node having the PNIC.

2. The method of claim 1 further comprising:
   determining that the VM has been re-assigned from a first network queue to a second network queue;
   identifying a NUMA node having the second network queue; and
   re-assigning the VM to the identified NUMA node having the second network queue.

3. The method of claim 1, generating an assignment for the VM to a network queue, said generating is biased toward assigning the VM to the network queue associated with the NUMA node.

4. The method of claim 3, wherein the network queue is associated with the VM when the VM receives traffic from the PNIC through the network queue.

5. The method of claim 1, wherein the generating bias comprises assigning the VM to the NUMA node having the PNIC when the NUMA node having the PNIC is operating at less than a threshold capacity and assigning the VM to a different NUMA node when the NUMA node having the PNIC is operating at or more than a threshold capacity.

6. The method of claim 5 further comprising:
   after assigning the VM to the different NUMA node, determining that the NUMA node having the PNIC has changed from operating at or more than the threshold capacity to operating at less than the threshold capacity; and
   based on said determination, reassigning the VM back to the NUMA node having the PNIC.

7. The method of claim 1, wherein the generating bias comprises assigning the VM to the NUMA node having the PNIC unless a set of additional conditions is identified.

8. A machine readable medium storing a program comprising sets of instructions for:
   identifying, from a set of non-uniform memory access (NUMA) nodes on a host machine, a NUMA node having a physical network interface card (PNIC);
   generating an assignment for a virtual machine (VM) to a NUMA node of the set of NUMA nodes, said generating is biased toward assigning the VM to the NUMA node having the PNIC; and
   using the generated assignment to assign the VM to the NUMA node having the PNIC.

9. The machine readable medium of claim 8, the program further comprising sets of instructions for:
   determining that the VM has been re-assigned from a first network queue to a second network queue;
   identifying a NUMA node having the second network queue; and
   re-assigning the VM to the identified NUMA node having the second network queue.

10. The machine readable medium of claim 8, wherein the VM is assigned to a network queue associated with the NUMA node having the PNIC.

11. The machine readable medium of claim 10, wherein the network queue is associated with the VM when the VM receives traffic from the PNIC through the network queue.

12. The machine readable medium of claim 8, wherein the generating bias comprises assigning the VM to the NUMA node having the PNIC when the NUMA node having the PNIC is operating at less than a threshold capacity and assigning the VM to a different NUMA node when the NUMA node having the PNIC is operating at or more than a threshold capacity.

13. The machine readable medium of claim 12 further comprising:
   after assigning the VM to the different NUMA node, determining that the NUMA node having the PNIC has changed from operating at or more than the threshold capacity to operating at less than the threshold capacity; and
   based on said determination, reassigning the VM back to the NUMA node having the PNIC.

14. The machine readable medium of claim 8, wherein the generating bias comprises assigning the VM to the NUMA node having the PNIC unless a set of additional conditions is identified.

15. A device comprising:
   a processing unit;
   a physical network interface card (PNIC); and
   a machine readable medium storing a program comprising sets of instructions for:
   identifying, from a set of non-uniform memory access (NUMA) nodes on the device, a NUMA node having the PNIC;
   generating an assignment for a virtual machine (VM) to a NUMA node of the set of NUMA nodes, said generating is biased toward assigning the VM to the NUMA node having the PNIC; and
   using the generated assignment to assign the VM to the NUMA node having the PNIC.

16. The device of claim 15, the program further comprising sets of instructions for:
   determining that the VM has been re-assigned from a first network queue to a second network queue;
   identifying a NUMA node having the second network queue; and
   re-assigning the VM to the identified NUMA node having the second network queue.

17. The device of claim 15, wherein a network queue is associated with the VM when the VM sends traffic to the PNIC through the network queue.

18. The device of claim 15, wherein a network queue is associated with the VM when the VM receives traffic from the PNIC through the network queue.

19. The device of claim 15, wherein the generating bias comprises assigning the VM to the NUMA node having the PNIC when the NUMA node having the PNIC is operating at less than a threshold capacity and assigning the VM to a different NUMA node when the NUMA node having the PNIC is operating at or more than a threshold capacity.

20. The device of claim 19 further comprising:
   after assigning the VM to a different NUMA node, determining that the NUMA node having the PNIC has changed from operating at or more than the threshold capacity to operating at less than the threshold capacity; and
   based on said determination, reassigning the VM back to the NUMA node having the PNIC.

21. The device of claim 15, wherein the generating bias comprises assigning the VM to the NUMA node having the PNIC unless a set of additional conditions is identified.

* * * * *